(12) United States Patent
Smith et al.

(10) Patent No.: US 9,809,184 B2
(45) Date of Patent: Nov. 7, 2017

(54) AUTOMOBILE USAGE ANALYTICS AND PERSONALIZATION

(71) Applicant: Adobe Systems Incorporated, San Jose, CA (US)

(72) Inventors: Kevin Gary Smith, Lehi, UT (US); William Brandon George, Pleasant Grove, UT (US); James H. Brown, Orem, UT (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/936,574

(22) Filed: Nov. 9, 2015

(65) Prior Publication Data

US 2017/0129426 A1    May 11, 2017

(51) Int. Cl.
| | |
|---|---|
| *B60R 22/00* | (2006.01) |
| *B60R 16/037* | (2006.01) |
| *G07C 5/00* | (2006.01) |
| *G07C 5/08* | (2006.01) |
| *B60K 35/00* | (2006.01) |
| *G06Q 30/02* | (2012.01) |
| *B60K 37/06* | (2006.01) |

(52) U.S. Cl.
CPC ............ *B60R 16/037* (2013.01); *B60K 35/00* (2013.01); *B60K 37/06* (2013.01); *G06Q 30/0266* (2013.01); *G07C 5/008* (2013.01); *G07C 5/0808* (2013.01); *G07C 5/0825* (2013.01); *B60K 2350/2052* (2013.01)

(58) Field of Classification Search
CPC .. B60R 16/037; B60K 35/00; G06C 30/0266; G07C 5/008; G07C 5/0808

USPC ............................................. 701/49, 99, 118
See application file for complete search history.

(56) References Cited

U.S. PATENT DOCUMENTS

| | | | |
|---|---|---|---|
| 8,694,328 B1* | 4/2014 | Gormley ............ G06Q 30/0621 |
| | | | 705/1.1 |
| 2004/0172177 A1* | 9/2004 | Nagai .................... G07C 5/085 |
| | | | 701/33.4 |
| 2008/0312796 A1* | 12/2008 | Matsuura ............. B60N 2/0248 |
| | | | 701/49 |
| 2010/0073124 A1* | 3/2010 | Mahalingaiah ........ G07C 5/006 |
| | | | 340/5.1 |

(Continued)

*Primary Examiner* — Shardul Patel
(74) *Attorney, Agent, or Firm* — Wolfe-SBMC

(57) ABSTRACT

Automobile usage analytics and personalization are described. In one or more implementations, a digital medium environment is described in which sensors are included with parts of automobiles, detect usage events that result from auto part usage, and produce sensor data indicative of the events. In this environment, a method is described of efficiently aggregating the sensor data and accurately determining automobile usage therefrom. Based on the automobile usage, the automobile is personalized for users. For example, personalized recommendations are made to automobile users to suggest goods, services, or information determined pertinent to the users. The aggregated sensor data can be used in other ways to personalize the automobile, such as to adjust seat positions, control climate, and so on. Further, the aggregated sensor data is used to answer queries regarding automobile usage that are made by users (e.g., manufacturers) via analytics tools of an auto usage reporting platform.

20 Claims, 9 Drawing Sheets

(56) References Cited

U.S. PATENT DOCUMENTS

| | | | |
|---|---|---|---|
| 2010/0187211 A1* | 7/2010 | Eisenhour | B60H 1/00742 219/202 |
| 2013/0218420 A1* | 8/2013 | Jendritza | B60N 2/002 701/49 |
| 2013/0219039 A1* | 8/2013 | Ricci | H04L 43/0876 709/223 |
| 2013/0231841 A1* | 9/2013 | Rothschild | G01C 21/3469 701/99 |
| 2014/0279707 A1* | 9/2014 | Joshua | G06Q 30/0283 705/400 |
| 2015/0088337 A1* | 3/2015 | Toohy | B60R 16/037 701/1 |

* cited by examiner

AUTOMOBILE USAGE ANALYTICS AND PERSONALIZATION

BACKGROUND

The ever expanding capabilities of digital properties, such as web sites and applications, include functionality to monitor user interaction with the properties and produce data indicative of the interaction. The continued evolution of this functionality enables user interactions of an increasingly complex nature with these properties to be described. Like the interactions users have with online properties, the many interactions users have with physical property can also be complex.

User interaction with an automobile, for instance, is complex—it involves interfacing with different systems of the automobile, adjusting settings to personalize the automobile for use on a per-driver (and passenger) basis, making in-driving adjustments based on external driving conditions, and so on. Further, many people spend significant amounts of time in and money customizing their automobiles—there are an almost unlimited number of ways in which people can customize automobiles. Despite the rich interactions people have with their automobiles, conventional techniques utilize a limited amount of information regarding peoples' interactions with automobiles. Consequently, conventional techniques are limited in the ability to provide an ideal driving (and passenging) experience.

SUMMARY

Automobile usage analytics and personalization are described. In one or more implementations, a digital medium environment is described in which sensors are included with parts of automobiles, detect usage events that result from auto part usage, and produce sensor data indicative of the events. In this digital medium environment, a method is described of efficiently aggregating the sensor data and accurately making a determination of automobile usage from the aggregated sensor data. The aggregated sensor data is used to personalize the automobile for a user based on the automobile usage. For example, personalized recommendations are made to a user of the automobile, such as to suggest a good, a service, or information that is determined pertinent to the user based on usage of the automobile. After the recommendations are generated, the recommendations are communicated for receipt by the automobile, where the recommendations can be presented to the user via an output interface of the automobile. In addition to enabling the presentation of personalized recommendations, the aggregated sensor data can be used in other ways to personalize the automobile for the user, such as to adjust seat positions, control climate, and so on.

Further, the aggregated sensor data is used to answer queries regarding automobile usage that are made by users via analytics tools of an auto usage reporting platform. The auto usage reporting platform maintains the aggregated sensor data which describes usage of automobiles, including usage of various auto parts that are configured with sensors to monitor their usage. The auto usage reporting platform enables users (such as auto manufacturers) to access this data by exposing the analytics tools, which are capable of providing a variety of information that describes automobile usage depending on a query made by a user. In response to receiving a query via an analytics tool, the auto usage reporting platform generates an answer to present the requested information about automobile usage via the analytics tool. The generated answer is then communicated for receipt by the user and presented via the analytics tool.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
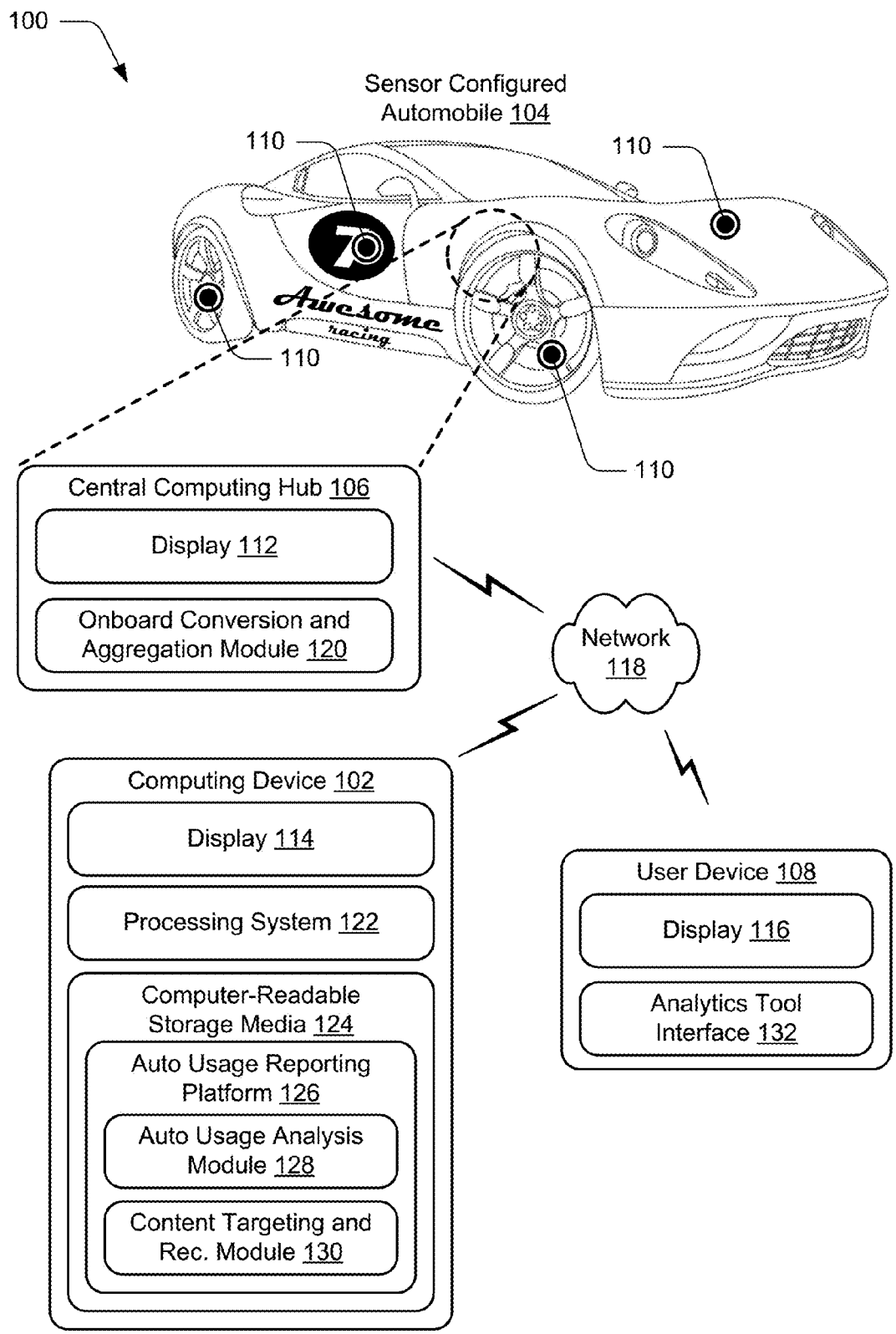
FIG. 1 is an illustration of a digital medium environment in an example implementation that is operable to employ automobile usage analytics and personalization techniques described herein.

Despite the rich interactions people have with their automobiles, conventional techniques utilize a limited amount of information regarding peoples' interactions with automobiles. This is largely because conventional techniques fail to capture information that details how people interact with automobiles. Instead, conventional techniques capture information about a few limited aspects of automobile usage. Consequently, conventional techniques limit the ability to improve on automobile-related analytics, customization, personalization, targeted advertising, profiling, automation, and so on.

Consider an example in which an individual sits in an automobile after it has been driven by someone else. Usually the individual will readjust at least a seat position and mirrors in order to safely operate the automobile. Oftentimes, the individual will also interact with controls of the automobile to readjust a climate of the automobile, entertainment options, and so on, based simply on personal preferences. In addition to making adjustments when the automobile was last driven by someone else, an individual may make adjustments even when he or she was the last driver. For example, the individual may drive his or her car to work out and set the temperature of the car to a first temperature. After working out the individual may feel hot, however, and when leaving the workout reduce the temperature in the car to a second temperature that is cooler than the first one. Conventional driving environment personalization techniques simply fail to capture and utilize data that describes such interactions, e.g., conventional techniques do not interact with health wearables worn by individuals to learn about elevated heart rates (due to working out), then track the temperature to which heating/cooling systems are set, and later when a health wearable again indicates an elevated heart rate, automatically adjust the temperature to the one previously set. Thus, the manners in which conventional techniques personalize an automobile for a particular user sitting in the automobile are limited.

Consider another example in which an individual has car troubles. Onboard many automobiles is a diagnostic computer that can be connected to a specialized device capable of obtaining diagnostic information from the automobile. As part of diagnosing the troubles the individual is having with the automobiles, this diagnostic information is obtained, e.g., at an auto repair shop. However, this information is not usually sent to a manufacturer of the automobile. Even if some diagnostic information is sent to auto manufacturers from time to time, granular usage, performance, and problem information is not sent. This scenario is illustrative of the reality that many auto manufacturers face, which is that they simply do not have data describing problems that arise with their automobiles that are actually being used or, importantly, data describing conditions that lead to those problems.

With the advent of the Internet of Things (IoT), however, data can be collected about objects that describes object use in a similar manner as data that is collected about digital properties describes the use of those digital properties. Implementation of the IoT involves configuring products (e.g., automobiles and the parts of automobiles) with sensors so that data indicative of product usage is collected. This allows IoT-based data to be captured for an automobile that provides a more robust representation of the automobile's use (e.g., through rich, granular, structured data describing use of the automobile and its various auto parts) than conventional techniques do.

Automobile usage analytics and personalization are described. In contrast to utilizing limited data about automobile interaction (e.g., through environmental settings stored in a limited number of key fobs or onboard diagnostic computers), the techniques described herein enable the collection, aggregation, and analysis of data describing automobile usage that is rich, granular, and structured using the IoT. By using the IoT, data packets with web-like structure that describe interactions with automobiles are collected not only from the automobile (e.g., the various different auto parts from which the automobile is constructed), but also from other automobiles in a vicinity of the automobile and from other objects associated with a user (e.g., driver or passenger) of the automobile, such as mobile phones, clothes, cargo, health wearables, and so on.

This data can be efficiently aggregated by a central computing hub onboard the automobile or communicated to a cloud-based auto usage reporting platform where that data is efficiently aggregated. The aggregated data set enables accurate determinations of automobile usage to be made. Further, by using information collected through the IoT about automobile use, and which is maintained by such an auto usage reporting platform, personalized recommendations and targeted content can be communicated to output interfaces (e.g., those of the automobile, electronic billboards, and so on) for presentation to the user of the automobile. The driving environment (e.g., seat adjustment, mirror adjustment, steering wheel adjustment, climate control, entertainment system preferences, and so on) can also be personalized at a granular level based on this data. In addition to these personalizations, the information collected though the IoT describing automobile use enables auto manufacturers to determine how their automobiles are actually used, effects of use on those automobiles, problems with the automobiles, conditions which lead to the problems, and so on.

Consider an example in which an automobile associated with a user is configured for the IoT. By "configured for the IoT" it is meant that parts of the automobile to be monitored are configured with sensors that detect usage events which result from usage of the automobile. The phrase "configured for the IoT" also means that the automobile is capable of interacting with other objects configured with sensors to detect usage events resulting from their use, such as a mobile phone of the auto user, clothes worn by the auto user, cargo stowed in the automobile, and so on.

In one example, an accelerator of the automobile can be configured with sensors to detect usage events which result from the accelerator being used, e.g., that the auto user (in this case the driver) is pushing a gas pedal to speed up the automobile, that the driver is releasing the gas pedal, and so on. In a similar manner, object and motion sensing systems of the automobile that are implemented with a variety of sensors can detect usage events associated with objects and motions that occur within some vicinity of the automobile, such as that the automobile passes another automobile on the road, stays behind some automobile on the road, and so on. In an example interaction of an automobile with other objects configured for the IoT, the automobile detects that a particular user is seated in a driver's seat because the automobile interacts with a sensor-configured mobile phone or sensor-configured clothes of the driver to identify the driver. Broadly speaking, automobiles of the IoT can be configured with multiple sensors—one or more sensors for each auto part that is to be monitored.

Responsive to detection of usage events, the sensors included with the parts of the automobile produce sensor data describing those events. For example, in response to detection of a driver pushing a gas pedal, sensors of the accelerator produce sensor data that describes the accelerating, such as when it was performed (e.g., by associating a timestamp with the accelerating), information identifying the driver that initiated the acceleration, that the acceleration was performed while passing a car, the type of road on which the acceleration was performed, the weather when the acceleration was performed, and so on.

The data describing the usage events is then provided for aggregation and analysis. By way of example, sensor data, configured as data packets produced by the auto part sensors of the automobile, is collected by an onboard central computing hub. Alternately or in addition, the sensor data can be uploaded (e.g., via the Internet) to an auto usage reporting platform implemented by a service provider. The data packets from the auto part sensors can be converted into aggregated usage data by the onboard central computing hub or the auto usage reporting platform, and can be aggregated with other usage data. In the continuing example, usage data from a data packet produced by sensors of an automobile's accelerator is aggregated with other usage data from the automobile's accelerator as well as with usage data from other systems of the automobile. The aggregated usage data is then maintained by the auto usage reporting platform, and at least in part by the onboard central computing hub.

The aggregated usage data that describes usage of the sensor configured automobile can then be used to provide targeted content and recommendations to a user of the automobile, personalize a driving environment of the automobile, and allow users to access the aggregated data using analytics tools exposed by the auto usage reporting platform. In contrast to conventional techniques, the techniques described herein collect data describing user interaction with automobiles in greater detail than conventional techniques. Consequently, the techniques described herein allow for a more personalized experience within an automobile and allow businesses (e.g., auto manufacturers) to make more informed decisions about product development than conventional techniques.

As used herein, the term "automobile" refers to a passenger vehicle designed for operation on roads and having one or more engines used rotate to wheels causing the automobile to be propelled. Examples of automobiles include cars, trucks, sport utility vehicles, vans, and the like. The term "auto part" refers to one of many parts of which an automobile is comprised, including by way of example and not limitation: wheels, tires, brakes, head lights, tail lights, brake lights, fog lights, bumpers, radiator, exhaust, driveline, belts, tensioners, wiper blades, shocks, spark plugs, ignition, fuel injector, gas tank, alternator, temperature controls, entertainment system interface, steering wheel, seat adjustment controls, window controls, lock controls, air filter, tie rod, differentials, and so forth. Auto parts can be configured with sensors in a variety of ways. For example, sensors can be embedded as part of the auto parts to communicate with devices (e.g., a central computing hub of the automobile) about their usage (e.g., using wired or wireless communication techniques), sensors can be attached to the auto parts using adhesives (e.g., the sensors can be included as part of stickers placed on the auto parts), and so forth. It is to be appreciated that the examples of auto parts and how these objects can be configured with a variety of different sensors should not be seen to limit the parts of automobiles that can be configured with sensors or how those objects can be configured with sensors to enable them to interact as part of the IoT. Indeed, a variety auto parts not specifically enumerated herein can be connected to the IoT without departing from the spirit and scope of the described techniques.

With regard to the objects with which an automobile of the IoT is configured to interact, as used herein "object" refers to a good that is usable by an individual and which can be configured or packaged with sensors to detect usage events that result from use and produce data indicative of the detected events. Examples of objects include devices (e.g., mobile phones, health wearables, tablet devices, GPS receivers, entertainment systems, navigation systems, e-readers, (DVD) players, digital music players, gaming consoles, gaming controllers, device peripherals, and so on), clothes, food, sporting equipment, toys, consumable/disposable products (e.g., cleaning products, diapers, hygiene products, toilet paper, paper towels, napkins, and so on), and so forth. Such objects can be configured with sensors in a variety of ways, such as by embedding the sensors into devices, weaving the sensors into clothes, placing stickers that include sensors on the objects or packaging, and so on. It is to be appreciated that the examples of objects and the manners in which these objects can be configured and/or packaged with a variety of different sensors should not be seen to limit the objects that can be configured or packaged with sensors or how those objects can be configured or packaged with sensors to enable them to interact as part of the IoT. Indeed, a variety goods not specifically enumerated herein can be objects of the IoT without departing from the spirit and scope of the techniques described herein.

The term "sensor" refers to any of a variety of types of sensors that auto parts and other objects can be configured with to detect usage events indicative of use and produce data indicative of the usage. Examples of sensors are enumerated in more detail in the discussion of the example environment. The term "usage event" refers to a change in the environment that results from use and that is detectable by the sensors with which the auto parts and other objects are configured. As mentioned above, an example usage event for an accelerator is pressing of a gas pedal. An example usage event for a radiator of a car is a coolant level monitoring action. Usage events of auto parts differ depending on an auto part as different auto parts are used in different ways, and different events are indicative of the auto part being used.

As used herein, the term "sensor data" refers to the data produced by the sensors of an auto part or by another object of the IoT to describe the usage events detected. As used herein, "statistics that summarize usage" of auto parts refer to calculations that can be derived from multiple pieces of the sensor data to describe the usage of automobiles or specific auto parts, e.g., an amount an auto part is used, which can include a number of hours the auto part has been used, a number of miles over which the auto part has been used, a number of times the auto part has been engaged in use, and so on. Other example statistics that summarize usage of auto parts are enumerated herein below.

The term "recommendation" refers to content that is configured to suggest at least one of a good, a service, or information to a user. A suggested "good" refers to a physical product that is available for purchase. A suggested "service" refers to a support product that can be provided by another entity to aid a user in accomplishing some task. Suggested "information" refers to content (e.g., text, pictures, and so on) that conveys data such as a message, counsel, instructions, education, and so on, to a user.

As used herein, "a digital medium environment" refers to the computing devices, the sensor configured automobiles, and other sensor configured objects; the connections among the computing devices, the sensor configured automobiles, and the other sensor configured objects; as well as the interfaces discussed in the example environment below and that make resources provided by service providers available to users.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automobile usage analytics and personalization techniques described herein. The illustrated environment 100 includes a computing device 102, a sensor configured automobile 104 having onboard a central computing hub 106, and a user device 108. The sensor configured automobile 104 is part of the digital medium environment 100 through the inclusion of the central computing hub 106 as well as the inclusion of sensors 110 that detect events indicative of auto part usage and produce data describing detected events. This data can then be used to generate recommendations for a user of the sensor configured automobile 104, personalize interfaces of the sensor configured automobile 104 for the user, and to answer queries regarding automobile usage as further described in relation to FIG. 2.

The computing device 102 and the user device 108, for instance, may each be configured as a desktop computer, a server computer, a laptop computer, a mobile device (e.g., assuming a handheld configuration such as a tablet or mobile phone), and so forth.

Figure 9:
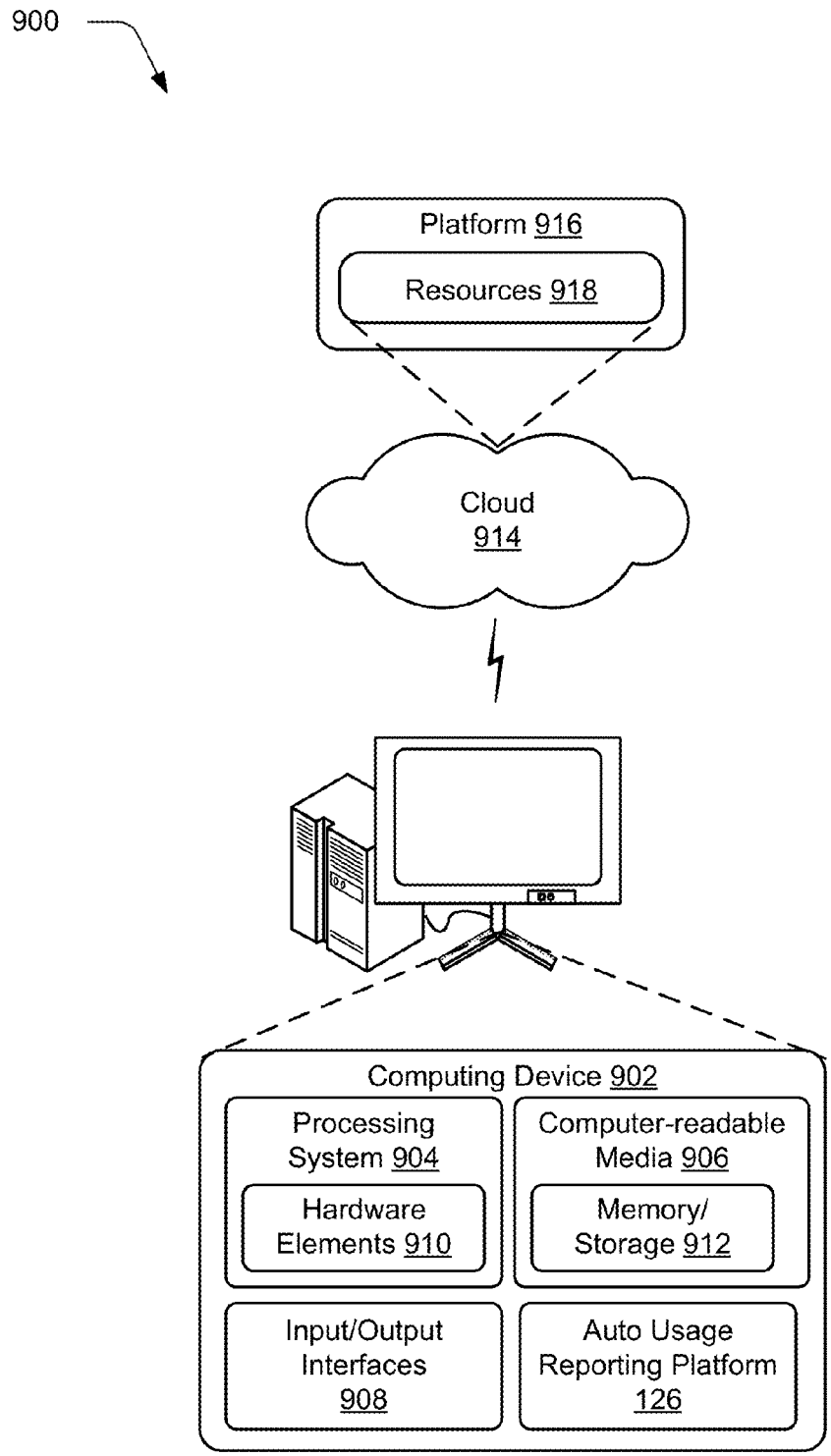
FIG. 9 illustrates an example system including various components of an example device that can be implemented as any type of computing device as described and/or utilized with reference to FIGS. 1-8 to implement embodiments of the techniques described herein.

The computing device 102, the central computing hub 106, and the user device 108 may range from full resource devices with substantial memory and processor resources (e.g., service-provider computers, personal computers, game consoles) to low-resource devices with limited memory and/or processing resources (e.g., mobile devices). The computing device 102, the central computing hub 106, and the user device 108 are each configurable with respective displays, such as displays 112, 114, 116. Additionally, although a single computing device 102, a single central computing hub 106, and a single user device 108 are shown, the computing device 102, the central computing hub 106, and the user device 108 may each be representative of a plurality of different devices, such as multiple servers utilized by a business to perform operations "over the cloud" as further described in relation to FIG. 9.

The computing device 102 and the user device 108 are illustrated with the sensor configured automobile 104 within the digital medium environment 100 as part of the Internet-of-Things (IoT). The IoT describes a digital medium environment in which a plurality of objects (including the sensor configured automobile 104) are configured with sensors to detect events that occur as a result of using the objects and in which the sensors have connectivity (e.g., network functionality such as wired or wireless communication abilities) to communicate data for receipt by the computing device 102, or by other devices, such as hub devices. This allows communication of information to support aggregating and analyzing object usage data, thereby creating opportunities for integration between a physical environment in which objects are used and techniques to track and analyze object usage. This is used to support functionality to improve efficiency, accuracy, and aide marketers and manufacturers as well as users of the objects. In particular, this is used to accurately make recommendations to users, accurately set interfaces of an automobile for the users in the automobile, and efficiently aggregate sensor data and accurately make determinations of usage from the aggregated sensor data.

The sensors 110 represent any of a variety of sensors that parts of an automobile may be configured with to detect events indicative of auto part use. By way of example, the sensors 110 can correspond to acoustic, sound, and vibration sensors; chemical sensors; electric current, electric potential, magnetic, and radio sensors; flow and fluid velocity sensors; ionizing radiation and subatomic particle sensors; navigation instrument sensors; position, angle, displacement, distance, speed, and acceleration sensors; optical, light, imaging, and photon sensors; pressure sensors; force, density, and level sensors; thermal, heat, and temperature sensors; proximity and presence sensors; and so on. The other objects of the IoT, with which the sensor configured automobile 104 can interact, may also be configured with any of a variety of sensors to detect events indicative of object use. In other words, the sensors 110 with which the sensor configured automobile 104 and objects of the IoT are configured enable events indicative of use to be detected.

For instance, the sensors 110 can detect events indicative of use of various auto parts of the sensor configured automobile 104, such as braking by a driver, seat adjustments made by a driver or passengers, climate changes made by a driver or passengers, automatic braking by a braking system, monitoring a coolant level of the radiator, pushing coolant from the radiator, starting the sensor configured automobile 104, turning off the sensor configured automobile 104, turning on lights, and so on. Further, the sensors 110 of the sensor configured automobile 104 may enable a determination of location at a given time, weather conditions, objects (e.g., other cars) nearby, and so forth.

After the sensors 110 detect an event indicative of an auto part's use, the sensors 110 produce data describing the detected event. For example, each of the sensors 110 can produce a data packet in response to detecting an event for which the sensor is employed. The data packets produced by the sensors 110 can be formatted in a structured fashion, which can include a variety of predetermined fields that are populated according to the detected event. Example data packets that can be produced by the sensors 110 of the sensor configured automobile 104 are described in more detail herein below.

Once produced, the sensor data can be communicated to the central computing hub 106 using wired or wireless techniques. The sensor data can also be communicated in a raw form or in an aggregated form over a network 118, such as the Internet, to provide a "cloud-based" computing environment, in which the computing device 102 provides services of one or more service providers. By way of example, some of the sensors 110 of the sensor configured automobile 104 may be configured to communicate the sensor data over the network 118 directly to the computing device 102. However, other sensors 110 may first communicate the sensor data to the central computing hub 106 which then routes the sensor data to the computing device 102.

Service providers are generally configured to make various resources available over the network 118 to users. In some scenarios, users sign up for accounts that are employed to access corresponding resources from a provider. The provider authenticates credentials of a user (e.g., username and password) before granting access to an account and corresponding resources. Other resources are made freely available, (e.g., without authentication or account-based access). The resources can include any suitable combination of services and/or content typically made available over a network by one or more providers. Some examples of services include, but are not limited to, communication services (e.g., email, instant messaging, voice over Internet Protocol (VoIP), and the like), online stores (e.g., Amazon®, Best Buy®, Walmart®, Costco®, and so on) via which users can select items such as goods or services for purchase, information providers (e.g., news services, blogging services, and the like), analytics services (e.g., Adobe® Analytics), which can be used to collect, organize, and report data describing object usage, and so forth.

Broadly speaking, the central computing hub 106 represents functionality to connect the sensors 110 of the sensor configured automobile 104. The central computing hub 106 is illustrated with onboard conversion and aggregation module 120 ("OCAM 120"), which represents functionality of the central computing hub 106 to convert web-like data packets received from the sensors 110 into dimensions and metrics. The OCAM 120 can also aggregate the sensor data that describes a single usage event for an auto part with other sensor data describing other usage events for that auto part. Further, the OCAM 120 can aggregate the sensor data describing usage events for that auto part with the sensor data that describes usage events for the other auto parts of the sensor configured automobile 104.

The sensor data collected from the sensors 110 of the sensor configured automobile 104 allows the central computing hub 106 to perform a variety of operations, including to apply machine learning techniques to learn preferences of different users as drivers and as passengers. For example, the central computing hub 106 is capable of learning from the sensor data how a particular user adjusts a driver's seat when driving the sensor configured automobile 104, how a particular user adjusts a climate (e.g., heating, cooling, seat heaters, and so on) for his or her portion of the automobile when driving, driving tendencies of a particular user (e.g., aggressive, law abiding, and so on), entertainment preferences of the user, seat and climate preferences as a passenger, and so on. The central computing hub 106 is also capable of applying learned information when it identifies a user seated in a particular location (e.g., driver or passenger seat) of the sensor configured automobile 104. For example, the central computing hub 106 is configured to initiate seat adjustments, climate adjustments, entertainment options, engine performance, and so on, according to the learned information.

The computing device 102 represents functionality of a service provider to obtain sensor data that describes usage of the sensor configured automobile 104 (including usage of its many auto parts), efficiently aggregate the sensor data (if not already aggregated), and accurately make a determination of usage from the aggregated sensor data. Based on the determined usage of the sensor configured automobile 104 and determined usage of particular auto parts, the computing device 102 is configured to provide recommendations to a user of the sensor configured automobile 104 and to answer queries made regarding the object usage. The computing device 102 has a processing system 122 that includes one or more processing devices (e.g., processors) and one or more computer-readable storage media 124. The illustrated digital medium environment 100 also includes auto usage reporting platform 126 that has an auto usage analysis module 128 and a content targeting and recommendation module 130 ("content targeting and rec. module 130") embodied on the computer-readable storage media 124 and operable via the processing system 122 to implement corresponding functionality described herein.

The auto usage reporting platform 126 represents functionality to implement techniques for automobile usage analytics and personalization as described herein. In particular, the auto usage reporting platform 126 represents functionality to obtain sensor data for objects of the IoT, including sensor data for the sensor configured automobile 104, which describes usage events detected by the sensors 110 of the sensor configured automobile 104 as well as the other objects. As discussed above, the other objects of the IoT, for which the auto usage reporting platform 126 can obtain data include, those associated with users that use the sensor configured automobile 104, e.g., mobile phones carried by drivers and passengers, clothes worn by drivers and passengers, health wearables worn by drivers and passengers, cargo placed in the car, and so on.

Further, the auto usage reporting platform 126 represents functionality to efficiently aggregate and maintain the sensor data. Like the OCAM 120, the auto usage reporting platform 126 is configured to convert data packets received from the sensors 110 or the central computing hub 106 into the converted sensor data for aggregation. For example, the auto usage reporting platform 126 converts the data packets into dimensions and metrics, which are maintained by the auto usage reporting platform 126 as converted sensor data. Additionally, the auto usage reporting platform 126 aggregates the converted sensor data for an object (e.g., a particular auto part) with other aggregated usage data of the object as well as with aggregated usage data of other objects of the IoT (e.g., other auto parts of the sensor configured automobile 104).

The auto usage analysis module 128 and the content targeting and rec. module 130 represent functionality to analyze usage of the sensor configured automobile 104, provide recommendations to users of the automobile, provide instructions for personalizing a driving environment of the automobile, and answer queries regarding automobile usage. In particular, the auto usage analysis module 128 is configured to make an accurate determination of usage for the sensor configured automobile 104 from the aggregated sensor data. With access to information accurately describing usage of the sensor configured automobile 104, the content targeting and rec. module 130 can determine goods, services, and information that are pertinent to a user of the automobile. The content targeting and rec. module 130 can then generate recommendations that suggest the determined good, service, or information, and communicate the generated recommendation to the sensor configured automobile 104, where the recommendation is presented to a user.

In addition to determining usage, the auto usage analysis module 128 is capable of accurately answering queries regarding usage of the sensor configured automobile 104, e.g., queries made via analytics tools exposed by the auto usage reporting platform 126. The auto usage reporting platform 126, for instance, exposes analytics tools which enable the user device 108 to provide a user with an analytics tool interface 132.

The analytics tool interface 132 represents functionality to provide a user access to the sensor data that describes usage of the sensor configured automobile 104. For example, the analytics tool interface 132 allows a user to select a particular analytics tool and, via the selected analytics tool, request information about usage of the sensor configured automobile 104. By way of example and not limitation, the analytics tool interface 132 may allow a user to access the sensor data using a freeform query and segmentation tool, a path and sequencing tool, an anomaly detection tool, a contribution analysis tool, a cohort analysis tool, and so forth. The analytics tool a user uses to request information about object usage formats such requests as queries for information about usage of an object.

Based on the query made, the auto usage analysis module 128 processes the aggregated sensor data to derive information that describes use of the sensor configured automobile 104, such as information requested about use of a particular part of the sensor configured automobile 104. The auto usage analysis module 128 then configures that information for communication for receipt by a user. The information derived by the auto usage analysis module 128 enables the queries made using the analytics tools to be answered. One way in which a query may be answered is with a report that indicates the information regarding usage of the sensor configured automobile 104. Regardless of the format of the information (e.g., report, graph(s), etc.), the auto usage reporting platform 126 generates answers to queries received from the analytics tools. The auto usage reporting platform 126 then communicates these answers to the users requesting information about usage of the sensor configured automobile 104. For instance, the auto usage reporting platform 126 communicates generated answers over the network 118 for receipt by the user device 108, which displays the generated answer to a user via the analytics tool interface 132.

In one or more implementations, the auto usage reporting platform 126 and its components (e.g., the auto usage analysis module 128 and the content targeting and rec. module 130) are implementable as software modules, hardware devices, or using a combination of software, hardware, firmware, fixed logic circuitry, etc. Further, the auto usage reporting platform 126 and its components can be implementable as standalone components of the computing device 102 as illustrated. In addition or alternatively, the auto usage reporting platform 126 and its components can be configured as components of a web service, an application, an operating system of the computing device 102, a plug-in module, or other device application as further described in relation to FIG. 9.

Having considered an example environment, consider now a discussion of some example details of the techniques for automobile usage analytics and personalization in accordance with one or more implementations.

Automobile Usage Analytics and Personalization

Figure 2:
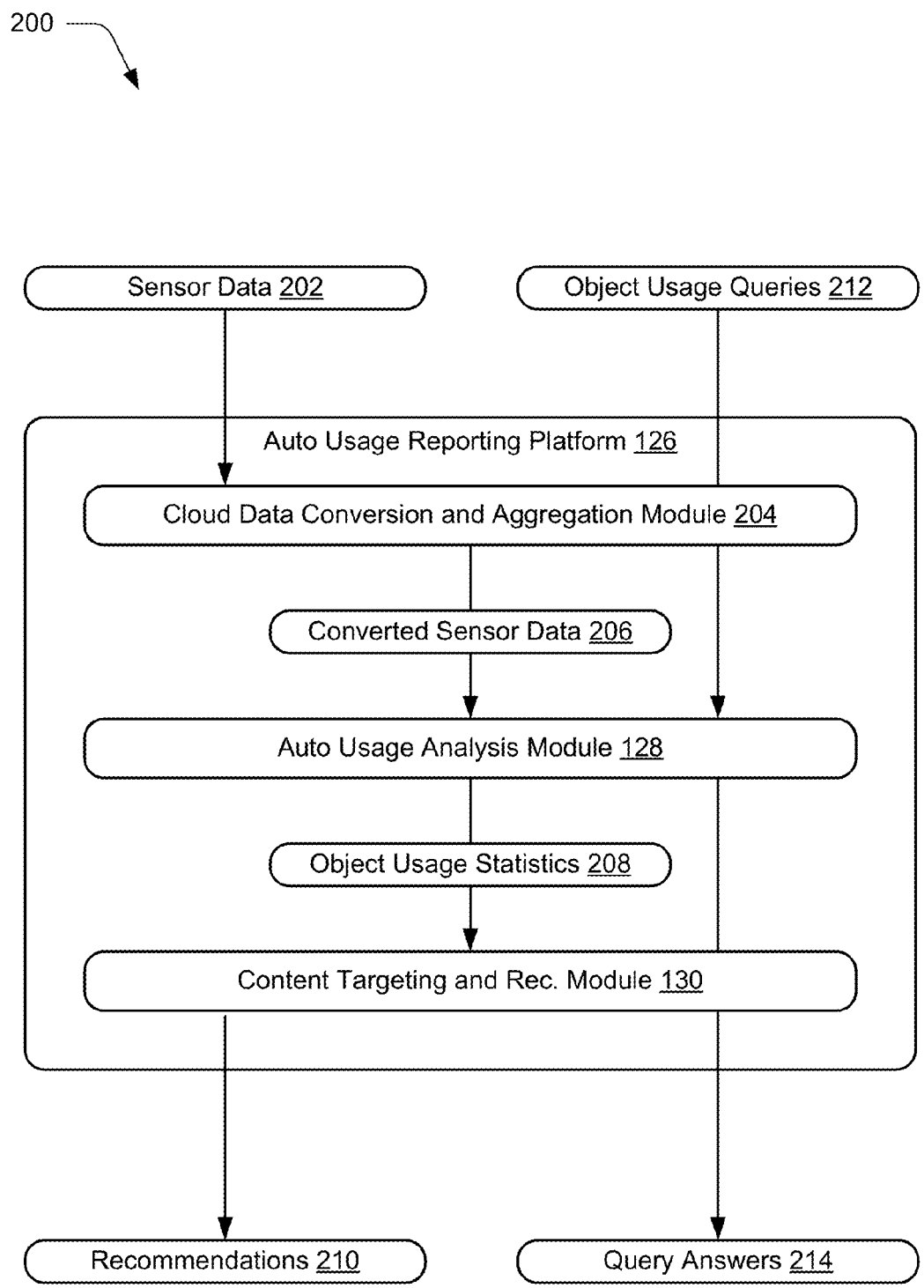
FIG. 2 depicts a system in the digital environment of FIG. 1 for personalizing automobiles and answering queries that request information about automobile usage using an auto usage reporting platform.

This section describes some example details of techniques for automobile usage analytics and personalization in accordance with one or more implementations. FIG. 2 depicts a system in the digital environment of FIG. 1 for efficiently aggregating sensor data and accurately making determinations of object usage from the aggregated sensor data. The determinations can be used to provide different benefits, such as to provide recommendations to users based on usage of the sensor configured automobile 104, cause a driving environment of the automobile to be personalized, and answer queries regarding usage of the automobile that are made by users via analytics tools of an auto usage reporting platform.

The example system 200 includes sensor data 202, which is provided as input to the auto usage reporting platform 126. The sensor data 202 represents data packets which describe events that result from use of sensor configured automobile 104 and are detected by the sensors 110 to monitor the auto parts of the automobile. The sensor data 202 for a particular auto part may be configured according to a data structure that is predefined according to how the particular auto part is used. For example, the sensor data 202 for a particular auto part can include data fields that are different than those used in conjunction with other auto parts, and can be chosen to describe the events which occur as a result of using the particular auto parts.

The following are examples of the sensor data 202 that different sensors of the sensor configured automobile 104 can produce based on detection of a usage event:

```
{
    action: "startup",
    object: "timing belt",
    parent: "Sports Car",
    timestamp: "10152015115200"
    status: 6
{
{
    action: "adjust seat forward",
    object: "driver's seat",
    occupantID: "SmithK_5902",
    parent: "Sports Car",
    quantity: 3.3
{
{
    action: "channel change",
    object: "entertainment system",
    parent: "Sports Car",
    occupantID: "SmithK_5902",
    channelFrom: 102,
    channelTo: 34
{
{
    action: "temperature change",
    object: "heating/cooling system",
    parent: "Sports Car",
    occupantID: "SmithK_5902",
    tempFrom: 75,
    tempTo: 73
{
```

As is indicated by these examples, the data packets produced as a result of detecting auto part usage events can have a variety of fields that the sensors 110 populate with values to indicate different information depending on the auto part and the field, such as a name of a usage event, a parent system, an occupant identifier, a location, an associated time, other values associated with the usage events, and so on. Despite differences in the sensor data 202 that is produced for different auto parts, the sensor data 202 is capable of describing use of the sensor configured automobile 104. In a similar fashion, sensor data can be produced for different objects of the IoT which describes the use of those objects.

After being produced, the sensor data 202 can be sent to the auto usage reporting platform 126. As discussed above, some of the sensors 110 may send the information directly to the auto usage reporting platform 126, e.g., over the Internet. Others of the sensors 110, however, may not be capable of sending the sensor data 202 directly over the network 118 to the auto usage reporting platform 126. Sensors that are not capable of sending the sensor data 202 directly to the auto usage reporting platform 126 over a network may instead send the sensor data 202 first to the central computing hub 106, e.g., using some wired or wireless communication technique. The central computing hub 106 can then send the sensor data 202 over the network 118 to the auto usage reporting platform 126. In any case, the sensor data 202 is obtained by the auto usage reporting platform 126.

In the illustrated example, the auto usage reporting platform 126 includes cloud data conversion and aggregation module 204 ("CDC&A module 204"). The CDC&A module 204 represents functionality for the auto usage reporting platform 126 that is similar to the functionality of the OCAM 120 for the central computing hub 106. In other words, the CDC&A module 204 represents functionality to convert the sensor data 202 into converted sensor data 206, which can be maintained at the auto usage reporting platform 126, such as in databases capable of maintaining aggregated data for vast numbers of automobiles connected with the IoT. By way of example, the CDC&A module 204 converts the individual data packets that make up the sensor data 202 into dimensions and metrics. This information is then maintained as the converted sensor data 206 in storage associated with the auto usage reporting platform 126. By aggregating the sensor data 202 at a centralized location, e.g., the auto usage reporting platform 126, the CDC&A module 204 can aggregate the sensor data 202 efficiently.

The CDC&A module 204 aggregates the converted sensor data 206 for an auto part of the sensor configured automobile 104 with other usage data of the auto part. In this way, accurate determinations about usage of a single auto part can be made from the converted sensor data 206. The CDC&A module 204 also aggregates the converted sensor data 206 for an auto part with the usage data of other auto parts. This allows accurate determinations about auto part usage to be made for the sensor configured automobile 104 or for the auto part across multiple different automobiles. For example, this allows accurate determinations to be made about usage events of the sensor configured automobile 104 such as what auto parts may have contributed to failure of another auto part. The aggregation also allows data about multiple objects (e.g., sensor configured automobile 104 and other automobiles of the same make and model) to be analyzed.

To determine usage, the auto usage reporting platform 126 employs the auto usage analysis module 128. The auto usage analysis module 128 is capable of processing the converted sensor data 206 to derive information about the usage of objects, such as the sensor configured automobile 104, the various parts of the sensor configured automobile 104, and objects associated with the users of the sensor configured automobile 104. The information derived to describe the usage is represented by object usage statistics 208.

The object usage statistics 208 can describe a variety of information about use of the sensor configured automobile 104, the various parts of the sensor configured automobile 104, and objects associated with users of the sensor configured automobile 104. For example, the object usage statistics 208 can indicate that a particular user, when driving to work out, typically sets the temperature for his or her side of the sensor configured automobile 104 to a first temperature, but when driving away from working out typically sets the temperature for his or her side to a second temperature that is different. It may be known that the user is going to work out based on the location to which the user drives and parks, clothes worn by the user (which can be detected due to sensors in the clothes), and changes in the user's physiological state as indicated by sensors of a health wearable. In any case, the object usage statistics 208 can indicate a correlation for the user between working out and changing the temperature of the sensor configured automobile 104. In a similar fashion, the object usage statistics 208 can indicate a correlation between the types of music a user listens to in association with different activities. For example, the object usage statistics 208 can indicate that a user typically listens to rock and roll in the sensor configured automobile 104 when driving to go golfing (which can be determined based on the presence of golf clubs in a trunk, clothes worn by the user, and a destination). The object usage statistics 208 may indicate, however, that when the user drives to visit parents he or she typically listens to folk music. These are just a few examples of the information that can be described by the object usage statistics 208. The object usage statistics 208 can describe a variety of information about usage of the sensor configured automobile 104 without departing from the spirit or scope of the techniques described herein.

The object usage statistics 208 can then be used to provide a variety of different services or conveniences. For example, the object usage statistics 208 enable recommendations 210 to be made to users of sensor configured automobiles, personalizations to be made to the driving environment (e.g., seat adjustments, climate control, engine performance, and so on) of sensor configured automobiles, and object usage queries 212 that are made by users with analytics tools of the auto usage reporting platform 126 to be answered.

With regard to making the recommendations 210, the content targeting and rec. module 130 is configured to make the recommendations 210 to a user based on how the user uses objects of the IoT, including the sensor configured automobile 104. To do so, the content targeting and rec. module 130 determines goods, services, and information that are pertinent to the user based on how the user uses objects. Given the object usage statistics 208, for example, the content targeting and rec. module 130 is capable of determining which goods, services, and information are pertinent to a user. After the content targeting and rec. module 130 determines goods, services, and information that are pertinent to a user, it generates one or more recommendations that suggest the determined goods, services, and information.

Figure 3:
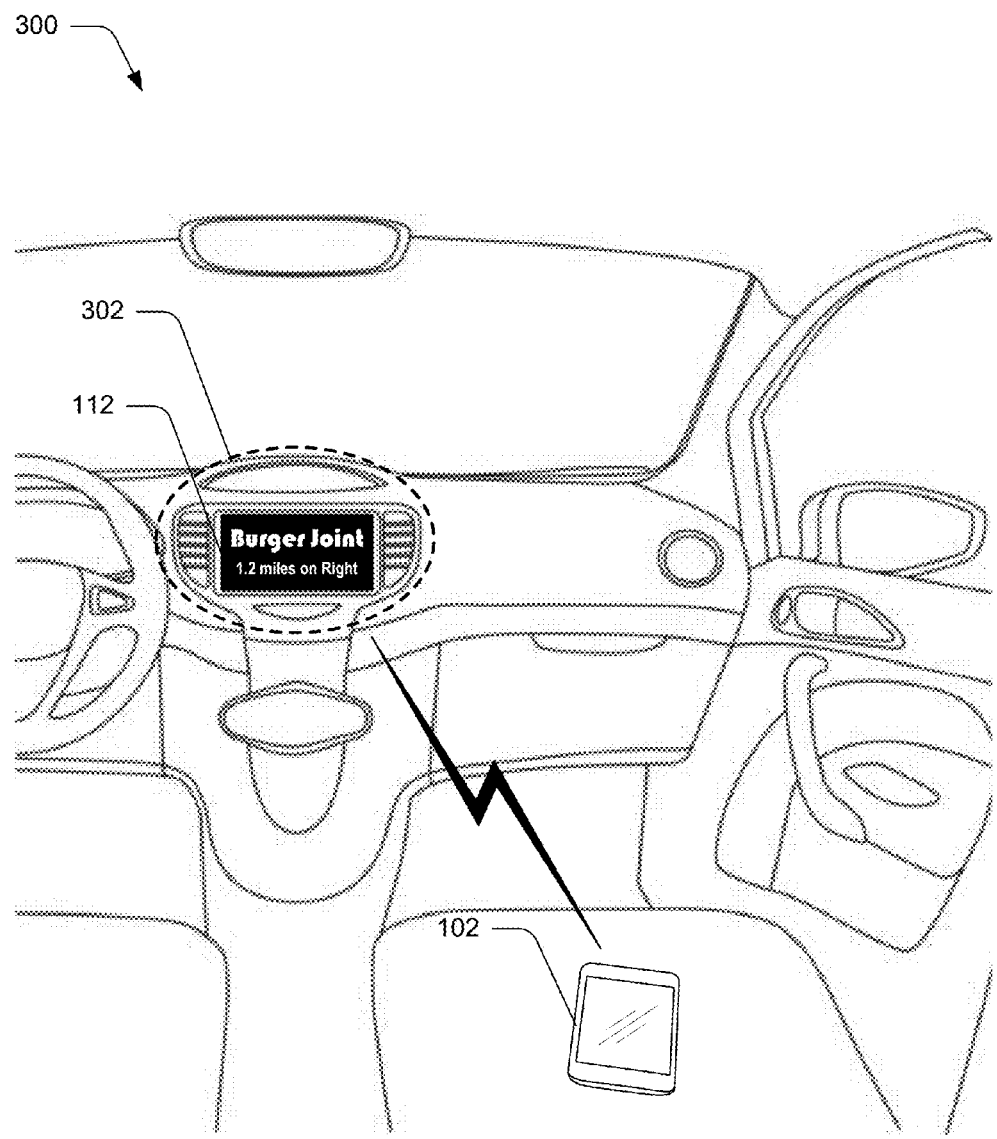
FIG. 3 depicts an example of a user interface that is generated to present a user with a personalized recommendation in an automobile which suggests a good, service, or information determined pertinent based, at least in part, on automobile usage of the user.
Figure 4:
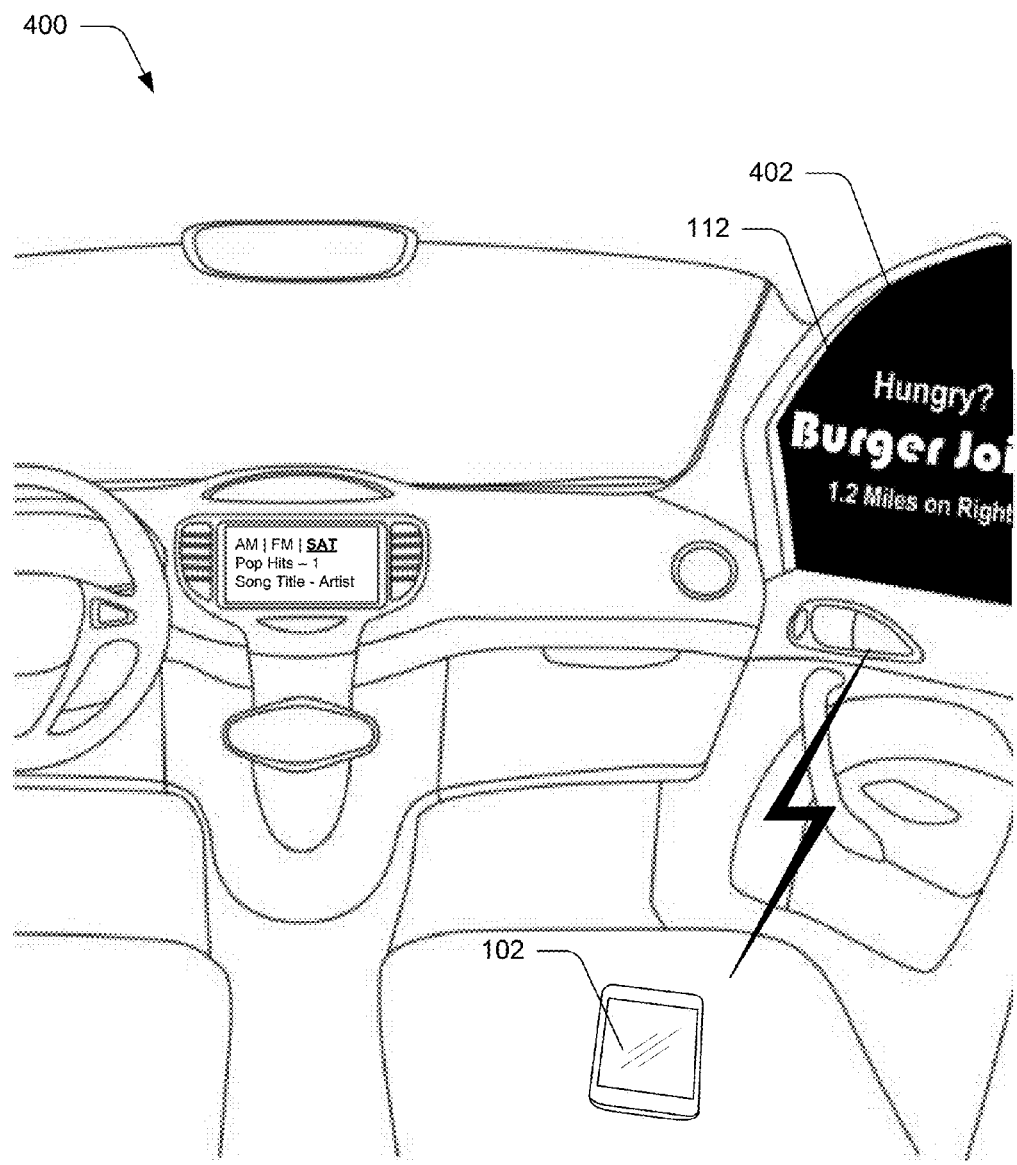
FIG. 4 depicts an example of another user interface that is generated to present the user with the personalized recommendation based, at least in part, on automobile usage of the user.
Figure 5:
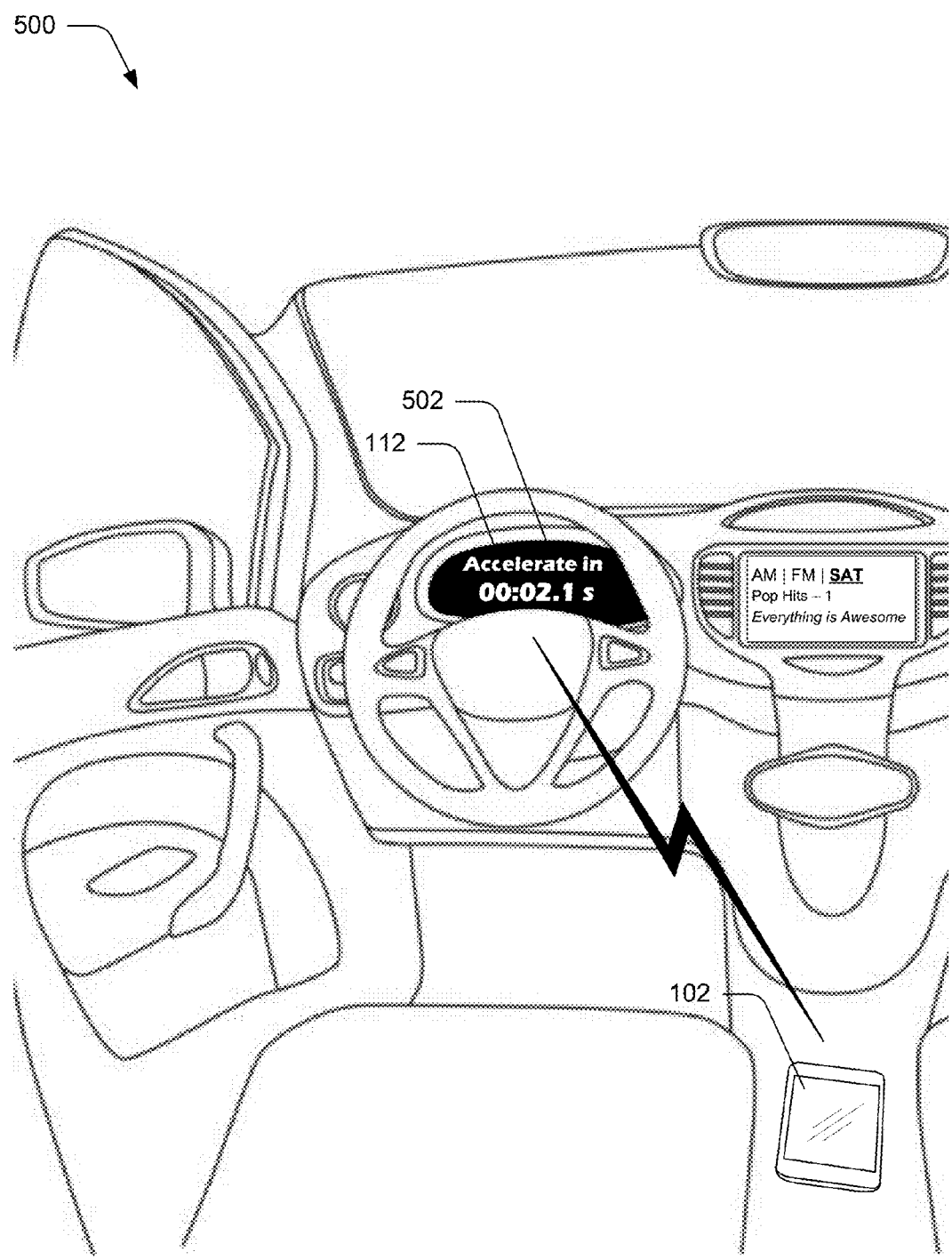
FIG. 5 depicts an example of another user interface that is generated to present the user with another personalized recommendation based, at least in part, on automobile usage of the user.

For context, consider FIGS. 3-5, which represent recommendations provided to a user of a sensor configured automobile. FIG. 3 depicts an example 300 of a user interface that is generated to present a user with a personalized recommendation in an automobile which suggests a good, service, or information determined pertinent based, at least in part, on automobile usage of the user. In particular, FIG. 3 depicts an interior of an automobile, such as the interior of the sensor configured automobile 104, having entertainment console 302. In one or more implementations, the entertainment console 302 is configured with the display 112. In this example, the entertainment console 302 is illustrated presenting a recommendation for "Burger Joint" via the display 112, which it indicates is "1.2 Miles on Right."

This recommendation may correspond to a recommendation 210 for a service that is determined pertinent to a user of the sensor configured automobile 104 based on usage of objects of the IoT, including the sensor configured automobile 104. By way of example, sensor data 202 indicating that the user has entered the sensor configured automobile 104 at a time when the user typically goes to lunch can be communicated to the auto usage reporting platform 126. By accessing the converted sensor data 206, the auto usage analysis module 128 can determine that the user typically drives to restaurants that serve burgers, restaurants that serve salads, or restaurants that serve pizza for lunch. Assume also that the auto usage analysis module 128 determines from the converted sensor data 206 that on the user's most recent trips for lunch the user went to a salad restaurant and a pizza restaurant. Furthermore, assume that the auto usage analysis module 128 determines that a burger restaurant having a high user rating (e.g., Burger Joint) is close to the sensor configured automobile 104.

Based on this information, the content targeting and rec. module 130 can determine that the service (e.g., serving burgers) offered by Burger joint is pertinent to the user and thus generate a recommendation 210 targeted to the user for Burger joint. The content targeting and rec. module 130 can then cause the recommendation to be communicated from the computing device 102 to the sensor configured automobile 104. The central computing hub 106 of the sensor configured automobile 104 can cause the received recommendation for Burger Joint to be displayed on the entertainment console 302 via the display 112.

FIG. 4 depicts an example 400 of another user interface in an automobile that is generated to present the user with the personalized recommendation based, at least in part, on automobile usage of the user. FIG. 4 also depicts the interior of the automobile depicted in FIG. 3, however, the personalized recommendation is presented on a different user interface than in FIG. 3. In particular, the personalized recommendation is presented on window 402, which may be configurable to display various information. In one or more implementations, the display 112 may correspond to the window 402. The personalized recommendation presented on window 402 is similar to the recommendation depicted in FIG. 3 and can be generated and communicated to the sensor configured automobile 104 from the computing device 102 for similar reasons to those discussed in reference to FIG. 3, e.g., it is determined that the user enters the sensor configured automobile 104 around lunchtime, the user frequents burger restaurants for lunch, the user has eaten pizza and salad recently for lunch, Burger Joint is highly rated, and so on.

In one or more implementations, windows of the sensor configured automobile 104 can be configured to present the user with an augmented reality. By "augmented reality" it is meant that the windows of the sensor configured automobile 104 may cause graphics to be displayed on the windows so that it appears to the user as if the user is driving by a billboard having an advertisement, even when there is no billboard on a side of the road, or when there is a blank billboard on the side of the road.

FIG. 5 depicts an example 500 of another user interface that is generated to present the user with another personalized recommendation based, at least in part, on automobile usage of the user. FIG. 5 also depicts the interior of the automobile depicted in FIGS. 3 and 4. However, the personalized recommendation in this example is presented on instrument panel 502, which may be configurable to display a variety of different information to a driver of the sensor configured automobile 104. Thus, in one or more implementations, the display 112 may correspond to the instrument panel 502. In this example, the instrument panel 502 is illustrated presenting a recommendation via the display 112 suggesting that the user accelerate in 2.1 seconds.

The recommendation may correspond to a recommendation 210 for information that is determined pertinent to the user of the sensor configured automobile 104 based on usage of objects of the IoT, including the sensor configured automobile 104. By way of example, the object usage statistics 208 may indicate that the user driving the automobile typically drives automobiles in an efficient manner, e.g., drives automobiles in a manner that gets as much distance out of a tank of gas as possible. Additionally, sensor data 202 may be communicated to the auto usage reporting platform 126 indicating that the sensor configured automobile 104 is approaching a hill. Assume also that the auto usage reporting platform 126 determines that accelerating the sensor configured automobile 104 for a duration will maximize the fuel efficiency over the duration. Given this information, the content targeting and rec. module 130 can determine that information regarding when to accelerate the sensor configured automobile 104 is pertinent to the user. The content targeting and rec. module 130 can thus generate a recommendation targeted to the user suggesting when to accelerate and cause the recommendation to be communicated from the computing device 102 to the sensor configured automobile 104. The central computing hub 106 of the sensor configured automobile 104 can cause the recommendation suggesting to accelerate to be displayed on the instrument panel 502 via the display 112.

FIGS. 3-5 are merely examples of recommendations that can be presented via output interfaces (e.g., entertainment console, display-configured windows, display-configured instrument panels, and so on) of the sensor configured automobile 104. A variety of other recommendations can be presented to users of the sensor configured automobile 104 based on its usage and via other output interfaces of the sensor configured automobile 104 (and other devices of a user such as a mobile phone or computing device) without departing from the spirit or scope of the techniques described herein.

In addition to providing recommendations to users and personalizing driving environments of automobiles, the techniques described herein also provide usage information about sensor configured automobiles (including usage information about the parts of those automobiles) via analytics tools. To do so, the auto usage reporting platform 126 exposes a variety of analytics tools, such as freeform query and segmentation tools, path and sequencing tools, anomaly detection tools, contribution analysis tools, cohort analysis tools, and so on. The analytics tools enable analysis of the converted sensor data 206.

For example, the auto usage reporting platform 126 can provide the analytics tool interface 132 to the user device 108 so that a user (e.g., an auto manufacturer) can examine, play with, or perform statistical computations on the converted sensor data 206. In one or more implementations, the analytics tool interface 132 allows a user of the user device 108 to select an analytics tool, and then indicate via the selected analytics tool the particular information about the sensor configured automobile 104 in which the user is interested.

Broadly speaking, the analytics tools allow a user to make queries for a variety of information regarding usage of sensor configured automobiles as well as the individual auto parts of those automobiles. Object usage queries 212 represent the queries made by users via the exposed analytics tools. The object usage queries 212 can request a variety of information in different formats from the auto usage reporting platform 126 depending, in part, on the analytics tool a user is using. It should be appreciated that the auto usage reporting platform 126 can expose analytics tools for analyzing aggregated auto part usage data in addition to or different from the enumerated analysis tools without departing from the spirit or scope of the techniques described herein.

Accordingly, the object usage queries 212 made by users via the analytics tools, along with the converted sensor data 206, serve as input to the auto usage analysis module 128. The auto usage analysis module 128 is configured to make a determination of automobile or auto part usage depending on the object usage query 212 received. As discussed above, the auto usage analysis module 128 is capable of performing an analysis corresponding to the query and deriving information regarding automobile or auto part usage from the converted sensor data 206. The auto usage analysis module 128 then uses the results of the analysis, e.g., the information derived regarding the automobile or auto part usage, to answer the object usage queries 212. As part of doing so, the auto usage analysis module 128 generates query answers 214, the format of which can depend largely on the analytics tool via which a corresponding object usage query 212 was made.

In any case, the query answers 214 are generated to present the requested information. In particular, the query answers 214 are generated to present the requested information via the analytics tool that was used to make the query. After being generated, the query answers 214 are communicated for receipt by the user. By way of example, the query answers 214 are communicated over the network 118 to the user device 108 where the query answers 214 are presented through the analytics tool interface 132.

Figure 6:
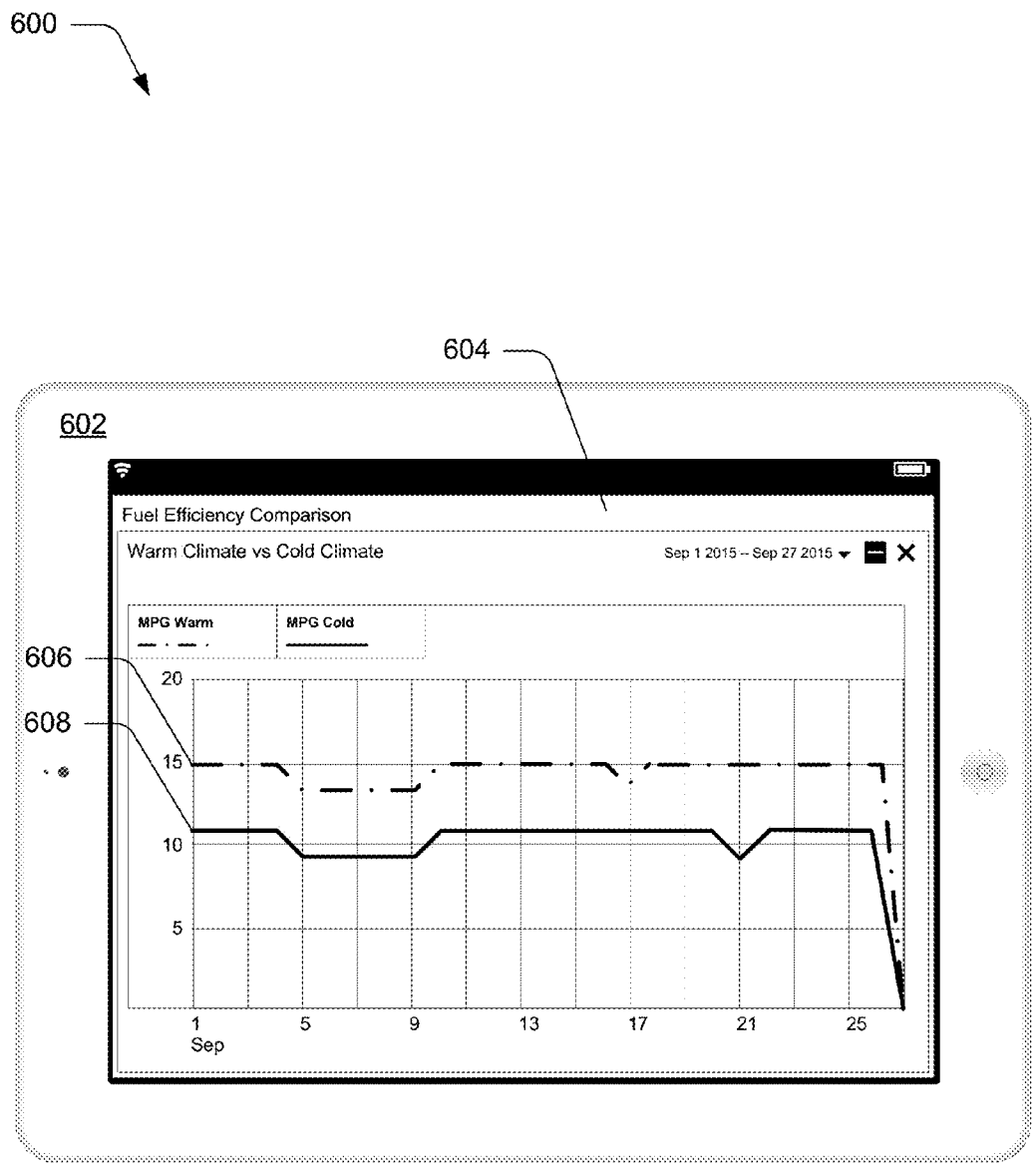
FIG. 6 depicts an example of a user interface that is generated to present information that describes auto usage to a user via an analytics tool.

With regard to the presentation of the query answers 214 via the analytics tool interface 132, consider FIG. 6. FIG. 6 depicts an example at 600 of a user interface that is generated according to a query answer to present information that describes auto usage to a user via an analytics tool. In particular, FIG. 6 includes a user computing device 602, which is depicted displaying a user interface 604. The computing device 602 in this example may correspond to the user device 108 of FIG. 1 and display the user interface 604 via the display 116. Further, the user interface 604 presents a comparison (configured as a line graph) for an auto part of miles per gallon (MPG) that automobiles having the auto part get in a warm climate versus a cold climate. A query answer 214 indicative of this comparison may be generated in response to a situation in which an auto manufacturer requests information via an analytics tool to compare MPGs for automobiles that have the particular auto part and are driven in warm weather against cold weather.

The user interface 604 includes line 606, which is indicative of an average daily MPG for automobiles having the auto part in warm climates, and line 608, which is indicative of an average daily MPG for automobiles having the auto part in cold climates. The user interface 604 depicted in FIG. 6 and the format in which the requested auto part usage information is presented is but one example of the information that can be presented to a user regarding automobile usage and the format in which the information can be presented. The analytics tools can be employed to present users with a wide variety of information regarding the usage of automobiles connected to the IoT. Additionally, this information can be formatted in a variety of ways without departing from the spirit or scope of the techniques described herein.

Having discussed example details of the techniques for automobile usage analytics and personalization, consider now some implementation examples to illustrate additional aspects of the techniques.

Geographic Location Based Recommendation Targeting

The techniques described herein allow a user of the sensor configured automobile 104 to be targeted with recommendations and content based on where the automobile is driven. With the events monitored by the sensors 110, information such as the locations that a user goes, the locations where a user has been, the billboards a user passes, where a user ate for lunch, whether a user is on the way home from work, and so on, is known.

This information allows marketers to more completely measure the effectiveness of advertisements on a user. With the sensor configured car, for example, marketers can know the marketing a user was exposed to while in the sensor configured automobile 104, including advertisements output via an audio systems, the billboards passed as mentioned above, and so on. This information can be combined with information from other IoT-enabled devices associated with a user (e.g., a mobile phone, tablet device, desktop computer, television, e-reader, and so on), and with information regarding what advertising content a user has been exposed to online and through traditional media channels (e.g., television, print, and the like) as well as with information about the brick-and-mortar stores into which a user has gone. Thus, the techniques described herein enable the advertising content to which a user is exposed to be tracked to a greater degree than conventional techniques. By knowing to a greater degree the advertising content to which a user is, the techniques described herein also enable marketers to determine which of the advertising content is effective in converting users into purchasers.

Furthermore, since the sensor configured automobile 104 knows a location of the users seated therein (and potentially a destination), content and recommendations can be targeted to the user as a function of location. Consider an example of delivering advertising content according to a conventional technique in which a marketer rents a billboard on a side of road for a fast food restaurant. A conventionally configured billboard shows the fast food advertising content to each automobile passing by regardless of whether the users within the automobiles are hungry, have ever eaten at that restaurant, or whether users are passing by at 7:00 AM in the morning and the fast food restaurant does not serve breakfast. In contrast to such conventional techniques, the techniques described herein can deliver targeted recommendations to a user who sits in the sensor configured automobile 104 for restaurants at which the user is determined likely to eat. On the way back from a restaurant, however, the output interfaces of the sensor configured automobile 104 do not present the user with restaurant recommendations. Instead, the output interfaces can present different information that may be unrelated to eating choices when returning from just having eaten.

People spend significant amounts of time in their automobiles, and automobiles are pivotal in many purchases made, in part, because they are used to take people to stores where the purchases are made and to haul goods purchased to a different location.

Complex Performance Analytics and Optimization

The techniques described herein enable performance analytics to be applied to usage of the sensor configured automobile 104 and enable optimization of the sensor configured automobile 104, including optimization of its various systems of auto parts. Automobiles are complex systems with several subsystems which in many cases comprise a variety of different auto parts assembled to provide a particular driving experience. Individual auto parts are typically manufactured to meet specific requirements so that collectively the auto parts can be fine-tuned to work together to enable operation of an automobile.

However, this fine tuning is largely based on a set of conditions that meet what is considered average user and location requirements, e.g., the fine tuning withstands the wear and tear of a driver who drives in a manner that is considered to be within a typical range of driving and in a location where weather and road conditions are considered to be within a typical range. To determine that auto parts and automobiles meet these conditions, auto manufacturers often test automobiles under average and extreme conditions. Tests may also be performed on new cars or on cars at certain milestones, e.g., at 30,000 miles, 60,000 miles, 100,000 miles, and so on. Generally though, automobile testing does not account for the conditions between extreme and average and throughout an entire lifecycle of the automobile. As a result, auto manufacturers may have an incomplete understanding regarding performance of the overall system, e.g., the automobile as a whole and its many subsystems.

Although many automobiles are configured with diagnostic tools to measure states of various auto parts within an automobile and to alert users and maintenance specialists of problems, these diagnostic systems are generally not connected to an auto usage reporting platform 126. Accordingly, users and maintenance specialists are limited to the data directly collected by the diagnostic system. By configuring the auto parts with sensors and then connecting them to the auto usage reporting platform 126 (e.g., either through a central computing hub 106 or through mobile devices of automobile users), manufacturers can collect usage data across a spectrum of different driving habits, different geographical environments, different mileages of the automobiles, different statuses of automobile engines, and so on.

The data aggregated about automobile usage under such a variety of conditions can be used as input to machine learning techniques to determine whether the automobiles are actually fine-tuned. The machine learning techniques can be applied to the data to identify changes that can be made to sensor configured automobiles (e.g., changing a particular auto part, an entire subsystem of the automobile, and so on) to improve performance. The machine learning techniques can also be used to identify whether some auto parts that perform as expected in testing actually fail more often than expected under certain conditions, e.g., in drier climates or when used by aggressive drivers. This type of information is not only valuable to auto manufacturers but also to the manufacturers of particular auto parts used in automobiles.

Driver and Passenger Interface Customization and Personalization

Of the user interfaces with which people interact, the interfaces of automobiles are some of the most customizable. Automobile users (e.g., drivers and passengers) may each have their own preferences for seat and mirror position, climate settings, entertainment options, and so on. Furthermore, drivers have different driving habits, and different destinations and activities for which automobiles are driven. The sensor configured automobile 104, which connects the various sensors included therein, other objects of the IoT (e.g., a user's clothes, cargo, health wearables, other automobiles in the vicinity, nearby displays such as electronic billboards, and so on), and which interacts with a driver, enables customization of interfaces of the sensor configured automobile 104 at a more granular level than conventional techniques. The sensor configured automobile 104 is configured to automatically adjust seats and mirrors for a driver. It is also configured to control a climate within to correlate driver preferences with current conditions, such as weather conditions outside and a state of the driver and passengers.

Consider an example in which the sensor configured automobile 104 is operated substantially by two people, e.g., a couple. Based on data collected from the sensors 110 during use of the sensor configured automobile 104, the central computing hub 106 and the auto usage reporting platform 126 may collect data indicating that a first person of the couple prefers the automobile warmer than a second person of the couple. Given this information, the central computing hub 106 can cause the temperature in the automobile to be warmer when the first person is in the automobile and cooler when the second person is in the automobile. The central computing hub 106 can also cause the sensor configured automobile 104 to make adjustments to the climate based on where the first person and the second person are seated, if they are both in the automobile.

Furthermore, the central computing hub 106 can cause the base temperature within the sensor configured automobile 104 to be adjusted up or down based on the weather outside, and even based on the clothes the first and second person are wearing. If the first person is bundled in multiple layers of clothing and in heavy jackets, for instance, the central computing hub 106 can reduce the temperature within the car even if the weather outside is cold. In a similar fashion, if one of the two people is wearing a health wearable that indicates they have just been exercising (e.g., based on a heart rate, number of steps taken in a recent duration of time, body temperature, and so on), the central computing hub 106 can cause the temperature to be reduced.

The techniques described herein enable other personalizations to be made throughout the sensor configured automobile 104. For example, the techniques can enable a mode of in-car entertainment to be set, e.g., set from radio stations to talk shows to movies based on who is in the sensor configured automobile 104. The central computing hub 106 can cause the entertainment to be changed based on preferences for a time of day or a destination. By way of example, a user of the sensor configured automobile 104 may prefer different entertainment when driving to go golfing than driving to work. Based on connection to the IoT, the sensor configured automobile 104 can also be capable of learning the types of books that a user of the automobile enjoys, e.g., based on connection to an electronic book service, or connection to an e-reader. Based on information regarding the types of media the user enjoys, the central computing hub 106 can suggest and preload books or other materials that the user is determinedly likely to enjoy.

In addition to configuration options, a driving experience of the sensor configured automobile 104 can also be optimized on a per driver basis. Assume, for instance, that the first person of the couple prefers to drive faster than the second person of the couple and that the first person likes to accelerate rapidly. The central computing hub 106 and the auto usage reporting platform 126 can learn this from the sensor data collected from the sensors 110. With this learned knowledge, the central computing hub 106 can cause engine parameters of the sensor configured automobile 104 to be optimized for each of the first person and the second person based on their driving patterns.

Personalized Driver Training

The techniques described herein enable drivers to be informed of laws in the areas through which the sensor configured automobile 104 is driven. The techniques can also aid drivers in understanding and following those laws. Through its connection to the IoT, for example, the sensor configured automobile 104 can receive information about the driving laws for a current location. Consider an example in which at a current location talking on a mobile phone while driving is permitted, but that the jurisdiction changes at an upcoming location (e.g., a different city, county, state, etc.) where talking on a mobile phone while driving is not permitted. With this information, the central computing hub 106 can cause interfaces of the sensor configured automobile 104 to output alerts (via audio or display output interfaces) which indicate that talking on a mobile phone is not permitted while driving in an upcoming jurisdiction. The alert may in some instances include a countdown, indicating a distance or time until entry into the next jurisdiction.

In addition to helping drivers follow local laws, the techniques described herein can help improve a user's driving. By way of example, the sensors 110 can detect how closely a user follows other automobiles on the road. The central computing hub 106 can cause suggestions to be output regarding how closely the user should follow other automobiles in various conditions, e.g., different weather and traffic conditions. With regard to other driving suggestions to improve a user's driving, the central computing hub 106 can cause suggestions to be output regarding how long a turn signal should be used before changing lanes, can cause an alert to be output for the driver to be aware of other automobiles (e.g., automobiles that are driving in a sporadic manner which indicates the driver is potentially intoxicated), and so on.

Furthermore, the techniques described herein can inform a driver of manners in which to drive to reduce wear and tear on various auto parts. By having auto parts that are configured with the sensors 110, the techniques described herein can collect information regarding an engine of the sensor configured automobile 104 and the wear and tear on the auto parts. Based on this information, the central computing hub 106 can cause suggestions to be output that indicate manners in which to drive to maximize performance given the engine configuration and state of the sensor configured automobile 104.

Broadly speaking, an automobile can be used in a way so as to maximize its output, whether that output is efficiency, horsepower, or torque. The techniques described herein can learn the driving behaviors of a driver and thus what the driver values in his or her driving experience, e.g., speed, gas mileage, and so on. The central computing hub 106 can make suggestions to the driver through direct, non-distractive feedback (or through other ways such as nightly emails) that indicate how to maximize the output the driver is determined to value.

In Automobile Application Markets

In one or more implementations, the sensor configured automobile 104 is customizable with applications (e.g., third-party applications) to extend the functionality of the sensor configured automobile 104. By "third-party" it is meant parties in addition to a manufacturer of the sensor configured automobile 104. An advantage of allowing customization of the sensor configured automobile 104 by third-parties is that it enables auto manufacturers and such third-parties to focus on aspects of automobiles in which they specialize. In other words, auto manufacturers and third-parties are not forced to develop solutions for automobiles in areas that are already suitably addressed by other companies.

Examples of applications for customizing the sensor configured automobile 104 include applications that augment map systems, applications that augment engine monitoring, applications to load entertainment (e.g., music, audio books, movies, and so on), applications that cause information about a location or destination of the sensor configured automobile 104 to be output, custom themes or wall papers for dash displays (e.g., entertainment consoles, instrument panels, and so on), and so forth. The functionality of the sensor configured automobile 104 can be extended and customized, through third-party applications and the like, in a variety of other ways without departing from the spirit or scope of the techniques described herein.

Vehicle Security

The techniques described herein also enable vehicle security to be improved for the sensor configured automobile 104 relative to conventional techniques. By way of example, security techniques with the sensor configured automobile 104 can involve detecting anomalies in a manner in which the automobile is operated.

For instance, the security techniques can involve attempting to identify a driver and passengers of the sensor configured automobile 104. If the drivers and passengers in the sensor configured automobile 104 are not recognized, then an anomaly in operation of the automobile is determined. In response to detection of such an anomaly, at least one of the central computing hub 106 and the auto usage reporting platform 126 can cause a message to be communicated to a user designated as owner of the car, such as a text message to a mobile phone of the owner indicating, "An unrecognized driver and unrecognized passengers are in your car." The central computing hub 106 and the auto usage reporting platform 126 can also provide the user designated as the owner with options for addressing the anomaly. For example, the user may be presented with an option that is selectable to alert law enforcement that unrecognized drivers are in the sensor configured automobile 104, an option that is selectable to add the driver to a safe drivers list if the user has given the driver permission to drive the sensor configured automobile 104, and so on.

Other examples of anomalies that the sensor configured automobile 104 may detect include detecting that the sensor configured automobile 104 was accessed in an unusual manner (e.g., being unlocked from the inside), detecting that the sensor configured automobile 104 is being driven into a part of town that the users of the of the sensor configured automobile 104 are not expected to drive, and so forth. Since a regular user of the sensor configured automobile 104 may drive into an unexpected part of town, the sensor configured automobile 104 is equipped with functionality to avoid false security alerts. For example, false security alerts triggered by an unexpected location can be avoided through synchronization of the sensor configured automobile 104 with trip planning software, an Internet browsing history of the regular users, and so on. A variety of other security techniques in addition to anomaly detection can be implemented with the sensor configured automobile 104 without departing from the spirit or scope of the techniques described herein.

These implementation examples should not be seen to limit the applications for which the automobile usage analytics and personalization techniques described herein can be utilized. By way of example and not limitation, the techniques described herein may also be utilized to check temperatures internal and external to the sensor configured automobile 104, check a crime rate in an area where parked, and use machine learning techniques to determine to slightly crack the windows or otherwise ventilate the automobile on a hot day. The techniques described herein can also be used, when a user of the sensor configured automobile 104 is looking at a map on a mobile phone while walking toward and entering the automobile, to automatically load the map into a navigation system of the sensor configured automobile 104.

Further, the techniques described herein can learn a user's preferences for gas prices, gas quality, and gas brands. When the sensor configured automobile 104 is low on gas, gas station options on an upcoming route can be suggested that match the user's preferences. Additionally, the techniques can be used to warn the user whose gas preferences are learned whether there will be a gas station that matches his or her preferences within a remaining gas range of the sensor configured automobile 104.

The techniques described herein can also perform risk assessments for a driver of the sensor configured automobile 104, and output warnings about conditions or behaviors that lead to unsafe driving. For example, the techniques described herein can examine the speed at which the driver drives the sensor configured automobile 104, weather and road conditions, mobile phone use by the driver, a number of people in the automobile, the particular people that are in the automobile, a volume of audio that is being output by an audio system of the automobile, and so on. Personalized risk warnings can then be configured for output based on an assessment of these and other factors.

The techniques described herein may be used to implement a variety of other features for sensor configured automobiles without departing from the spirit or scope of the automobile usage analytics and personalization techniques described herein. Having discussed example details of the techniques for automobile usage analytics and personalization, consider now some example procedures to illustrate additional aspects of the techniques.

Example Procedures

This section describes example procedures for automobile usage analytics and personalization in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIG. 1 or one implemented as the example system 200 of FIG. 2 that make use of an auto usage reporting platform 126 having an auto usage analysis module 128 and content targeting and rec. module 130.

Figure 7:
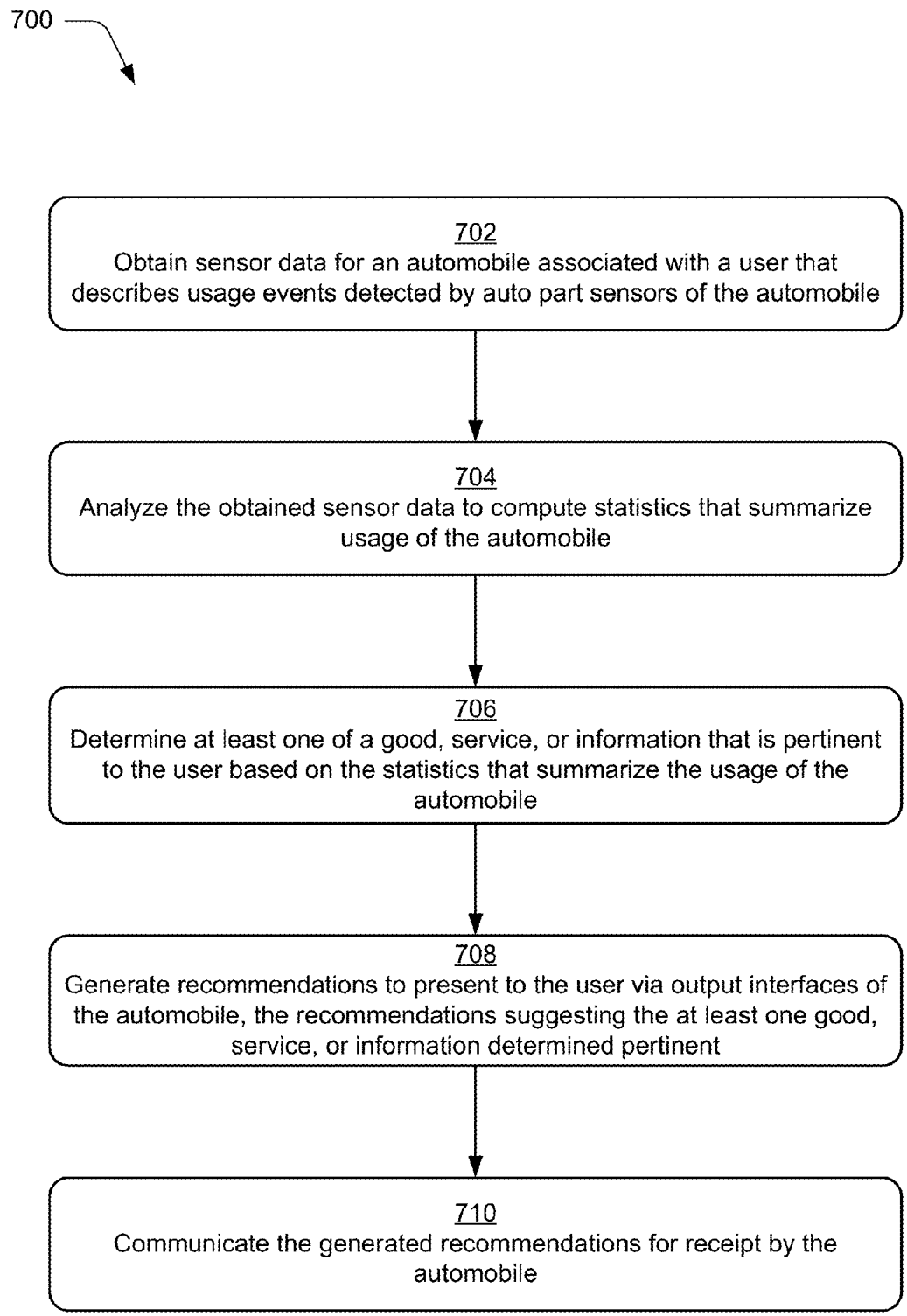
FIG. 7 is a flow diagram depicting a procedure in an example implementation in which sensor data is obtained for an automobile that describes usage of the automobile, and in which recommendations are generated for a user of the automobile based on the usage.

FIG. 7 depicts an example procedure 700 in which sensor data is obtained for an automobile that describes usage of the automobile, and in which recommendations are generated for a user of the automobile based on the usage. The example procedure 700 is implemented in a digital medium environment (e.g., the Internet of Thing (IoT)) in which sensors are included with parts of automobiles, detect usage events that result from automobile usage, and produce sensor data indicative of the events. To generate the recommendations, sensor data is obtained for an automobile associated with a user that describes usage events detected by auto part sensors of the automobile (block 702). For example, the auto usage reporting platform 126 obtains the sensor data 202 that is produced by the sensors 110 of the sensor configured automobile 104. The sensor data 202 describes usage events detected by the sensors 110 that occur as a result of using the sensor configured automobile 104 (or a monitored auto part of automobile).

The obtained sensor data is analyzed to compute statistics that summarize usage of the automobile (block 704). For example, the auto usage analysis module 128 computes the object usage statistics 208 which summarize usage of the sensor configured automobile 104. As discussed above, the object usage statistics 208 can describe a variety of information about use of the sensor configured automobile 104, the various auto parts that make up the sensor configured automobile 104, and objects associated with users of the sensor configured automobile 104. In one example, the object usage statistics 208 can indicate that when a user typically drives the sensor configured automobile 104 at lunchtime, the user drives to burger restaurants, pizza restaurants, or salad restaurants.

Based on the statistics that summarize the usage of the automobile, at least one of a good, a service or information is determined pertinent to the user (block 706). For example, the content targeting and rec. module 130 determines what goods, services, and information are pertinent to the user based on the object usage statistics 208. A determination as to pertinent goods, services, and information can involve not only the object usage statistics 208 for the sensor configured automobile 104, but also statistics describing use of other objects of the IoT as well as a variety of other information (e.g., a browsing history of the user). With reference again to the lunchtime scenario, the content targeting and rec. module 130 can determine a pertinent restaurant for the user based on the object usage statistics 208 that indicate the restaurants the user drove to most recently during lunchtime, restaurants for which the user has obtained information via other devices (e.g., mobile phone, desktop computer, and so on), restaurants that other similar users have rated highly via restaurant rating services, and so on.

Recommendations are generated for presentation to the user via output interfaces of the automobile (block 708). The generated recommendations suggest the at least one good, service, or information that is determined pertinent to the user. For example, the content targeting and rec. module 130 generates the recommendation 210, which suggests the at least one good, service, or information determined pertinent to the user at block 706. In the continuing example, the content targeting and rec. module 130 generates a recommendation which suggests "Burger Joint" to the user, as illustrated in FIGS. 3 and 4. As depicted in the examples of FIGS. 3 and 4, the recommendation can be generated for different output interfaces of the sensor configured automobile 104, e.g., in one the recommendation is generated for output via the entertainment console 302 and in the other the recommendation is generated for output via the window 402. Recommendations can be generated for output via other output interfaces of the sensor configured automobile (e.g., via an audio system) without departing from the spirit or scope of the techniques described herein.

The generated recommendations are communicated for receipt by the automobile (block 710). For example, the content targeting and rec. module 130 communicates the recommendations 210 to the sensor configured automobile 104 via the network 118. After being received, the central computing hub 106 can cause the recommendations 210 to be output via the output interfaces of the sensor configured automobile 104. With regard to the examples illustrated in FIGS. 3-5, the central computing hub 106 can cause the recommendations to be output via the entertainment console 302, the window 402, or the instrument panel 502 of the sensor configured automobile 104.

Figure 8:
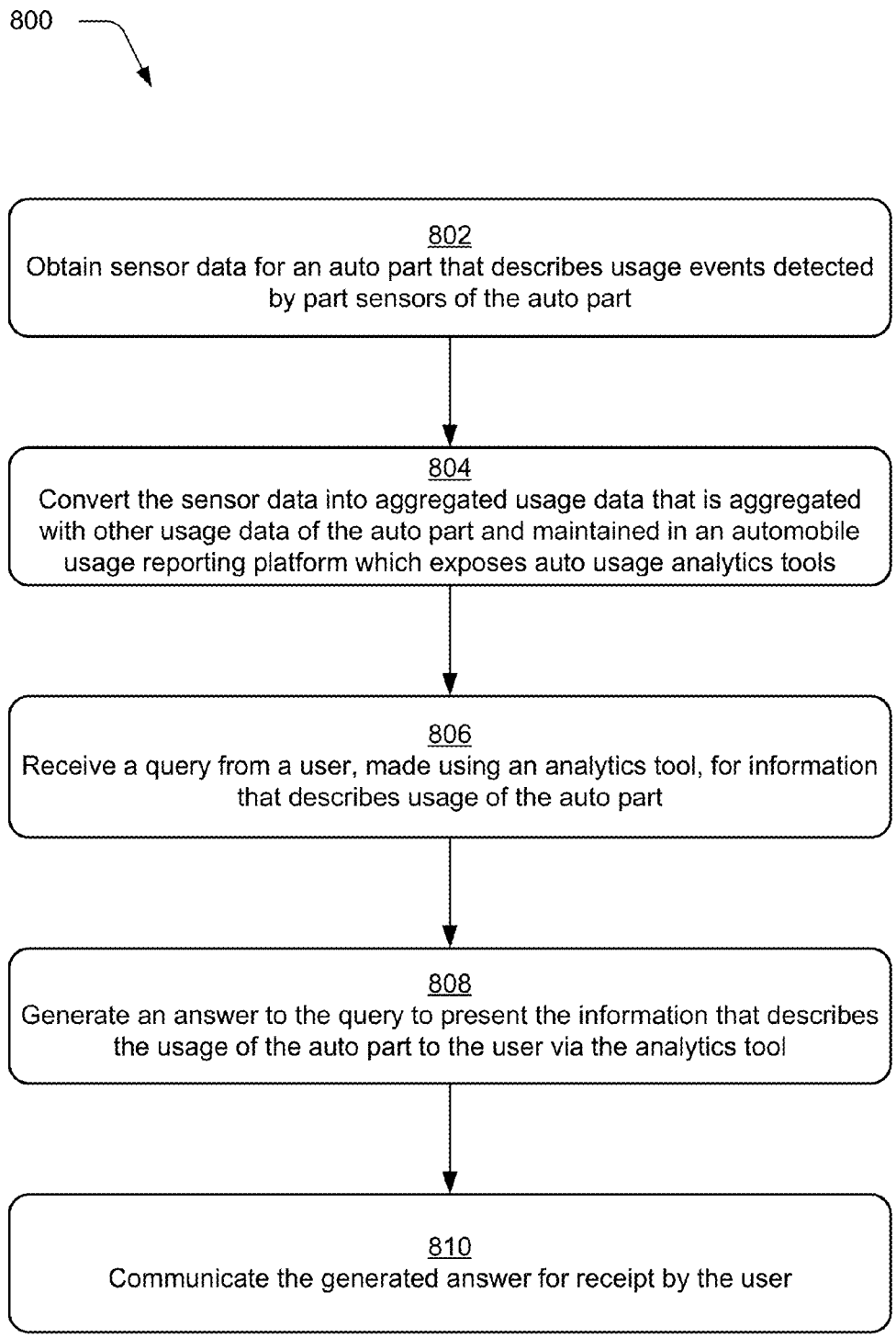
FIG. 8 is a flow diagram depicting a procedure in an example implementation in which sensor data obtained for an automobile is aggregated and maintained in a remote auto usage reporting platform, and in which a query made for information about the automobile via an analytics tool of the auto usage reporting platform is answered.

FIG. 8 depicts an example procedure 800 in which sensor data obtained for an automobile is aggregated and maintained in a remote auto usage reporting platform, and in which a query made for information about the automobile via an analytics tool of the auto usage reporting platform is answered. Like the example procedure 700, the example procedure 800 is also implemented in a digital medium environment such as the IoT. To answer queries regarding auto part usage that are made by users via analytics tools of an auto usage reporting platform, sensor data is obtained for an auto part that describes a usage event detected by part sensors of the auto part (block 802). For example, the auto usage reporting platform 126 obtains the sensor data 202 that is produced by the sensors 110 of the sensor configured automobile 104. The sensor data 202 describes usage events detected by the sensors 110 that occur as a result of use of the sensor configured automobile 104, including use of monitored auto parts of the automobile.

The obtained sensor data is converted into aggregated usage data that is aggregated with other usage data of the auto part and maintained in the auto usage reporting platform (block 804). The auto usage reporting platform at which the aggregated usage data is maintained exposes analytics tools to provide users with information that describes automobile usage. For example, the CDC&A module 204 converts the sensor data 202 obtained by the auto usage reporting platform 126 into aggregated usage data, which is represented by the converted sensor data 206. The converted sensor data 206 is aggregated with other usage data of the sensor configured automobile 104 and is maintained at the auto usage reporting platform 126. The auto usage reporting platform 126 exposes analytics tools to provide users with information that describes automobile (including auto part) usage. For example, the auto usage reporting platform 126 provides information to the user device 108 so that the analytics tool interface 132 can be output at the user device 108.

A query for information that describes usage of the auto part and made using an analytics tool is received (block 806). For example, a query made by a user of the user device 108 using the analytics tool interface 132 for information regarding usage of an auto part of the sensor configured automobile 104 is received at the auto usage reporting platform 126. The query is then processed by the auto usage analysis module 128 to accurately make a determination of auto part usage from the converted sensor data 206 to answer the query regarding auto part usage.

An answer to the query is generated to present the information that describes the usage of the auto part to the user via the analytics tool (block 808). For example, the auto usage analysis module 128 generates an answer to the query received at block 806. The auto usage analysis module 128 generates the answer for presentation to a user via the analytics tool used to make the query, e.g., via the analytics tool interface 132. The answer can be configured in a variety of different formats such as a graph, a report, a portion of text, and so forth, without departing from the spirit or scope of the techniques described herein.

Once generated, the answer is communicated for receipt by the user (block 810). For example, the auto usage reporting platform 126 communicates the answer generated at block 808 over the network 118 to the user device 108, where the answer can be output to a user via the analytics tool interface.

Having described example procedures in accordance with one or more implementations, consider now an example system and device that can be utilized to implement the various techniques described herein.

Example System and Device

FIG. 6 illustrates an example system generally at 900 that includes an example computing device 902 that is representative of one or more computing systems and/or devices that implement the various techniques described herein. This is illustrated through inclusion of the auto usage reporting platform 126, which operates as described above. The computing device 902 may be, for example, a server of a service provider, a device associated with a client (e.g., a client device), an on-chip system, and/or any other suitable computing device or computing system.

The example computing device 902 includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 902, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software are achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device implementation, implementation of functionality described herein is distributed throughout the system 900. For example, the functionality is implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices in an environment in which sensors are included with parts of automobiles, detect usage events that result from automobile usage, and produce sensor data indicative of the usage events, the method further implemented to generate recommendations that are based on the automobile usage, the method comprising:
    obtaining the sensor data, by the one or more computing devices, for an automobile associated with a user that describes the usage events detected by auto part sensors of the automobile;
    analyzing the obtained sensor data to compute statistics that summarize usage of the automobile;
    determining, by the one or more computing devices, at least one of a product or service that is pertinent to the user based on both the statistics that summarize the usage of the automobile and interaction data associated with the user that describes interactions of the user with other sensor-configured objects;
    generating one or more recommendations to suggest the determined product or service by presenting the one or more recommendations to the user via output interfaces of the automobile; and
    communicating, by the one or more computing devices, the generated one or more recommendations to the automobile for presentation via the output interfaces.

2. The method as described in claim 1, further comprising determining the at least one product or service that is pertinent to the user based on learned preferences of the user that are learned by applying machine learning to the obtained sensor data.

3. The method as described in claim 1, wherein the at least one product or service is determined pertinent based on the user and at least one other user, the user being detected as a driver of the automobile and the other user being detected as a passenger in the automobile.

4. The method as described in claim 1, wherein the at least one product or service is determined pertinent to the user based on a current location of the automobile.

5. The method as described in claim 1, wherein the at least one product or service is determined pertinent to the user based on a destination of the automobile.

6. The method as described in claim 1, wherein information suggesting how to drive the automobile is determined pertinent to the user based on the statistics that summarize the usage of the automobile, and the one or more recommendations are generated to include the information suggesting how to drive the automobile.

7. The method as described in claim 1, wherein the sensor data describes adjustments made by the user to configure a driving environment of the automobile.

8. The method as described in claim 7, further comprising causing the adjustments to be made to the driving environment automatically in response to detecting the user entering the automobile.

9. The method as described in claim 8, wherein the adjustments are made to at least one of:
a position of a seat of the automobile;
a position of one or more mirrors of the automobile;
a position of a steering wheel of the automobile;
a climate of at least a portion of the automobile; or
entertainment preferences of the automobile.

10. A method implemented by one or more computing devices in an environment in which sensors are included with parts of automobiles, detect usage events that result from auto part usage, and produce sensor data indicative of the usage events, the method further implemented to efficiently aggregate the sensor data and accurately make a determination of auto part usage from the aggregated sensor data to answer queries regarding the auto part usage that are made by users via analytics tools of an auto usage reporting platform, the method comprising:
obtaining, by the one or more computing devices, the sensor data for an auto part and environmental data associated with the auto part, the sensor data describing a usage event detected by one or more auto part sensors of the auto part and the environmental data describing driving conditions in which an automobile having the auto part is operated at a time of the usage event;
converting, by the one or more computing devices, the sensor data into aggregated usage data by aggregating the usage data with other usage data of the auto part, the other usage data being maintained in the auto usage reporting platform which exposes the analytics tools to provide the users with information that describes the auto part usage;
receiving a query from a user, by the one or more computing devices and made using an analytics tool, for information that describes usage of the auto part;
generating, by the one or more computing devices, an answer to the query based on the aggregated usage data and the environmental data, the generated answer configured for output via the analytics tool to present the information that describes the usage of the auto part; and
communicating, by the one or more computing devices, the generated answer to the user for presentation via the analytics tool.

11. The method as described in claim 10, further comprising aggregating the usage data of the auto part with the other usage data of the auto part and with usage data of other parts of an automobile that includes the auto part and the other parts.

12. The method as described in claim 10, wherein generating the answer to the query includes determining the usage of the auto part from the aggregated usage data maintained in the auto usage reporting platform.

13. The method as described in claim 10, wherein the generated answer enables a user device to display the information that describes the usage of the auto part via the analytics tool.

14. The method as described in claim 10, wherein the obtained sensor data is formatted in data packets which each describe a particular usage event, the sensor data formatted as the data packets by the one or more auto part sensors.

15. The method as described in claim 10, wherein the sensor data obtained for the auto part has different fields for describing the usage events of the auto part than the sensor data obtained for different auto parts.

16. The method as described in claim 10, wherein the analytics tools exposed by the auto usage reporting platform include at least one of:
a freeform query and segmentation tool;
a path and sequencing tool;
an anomaly detection tool;
a contribution analysis tool; or
a cohort analysis tool.

17. A system of an automobile implemented in an environment in which sensors are included with parts of automobiles, detect usage events that result from automobile usage, and produce sensor data indicative of the usage events, the system further configured to output recommendations generated for presentation to a user of the automobile based on automobile usage, the system comprising:
one or more processors; and
memory having stored thereon instructions that are executable by the one or more processors to perform operations comprising:
receiving the sensor data from the auto part sensors of the automobile that describes the usage events detected by the auto part sensors;
communicating the sensor data to an auto usage reporting platform that is configured to generate one or more recommendations for presentation to the user, the one or more recommendations suggesting at least one of a product or a service determined pertinent to the user based on usage of the automobile according to the sensor data and further based on interaction data associated with the user that describes interactions of the user with other sensor-configured objects;
receiving the one or more recommendations from the auto usage reporting platform; and
outputting the one or more recommendations via an output interface of the automobile for presentation to the user.

18. The system as described in claim 17, wherein the output interface is a display interface of the automobile.

19. The system as described in claim 17, wherein the sensor data describes adjustments made by the user to configure a driving environment of the automobile.

20. The system as described in claim 19, wherein the operations further comprise causing the adjustments to be made to the driving environment automatically in response to detection of the user entering the automobile.

* * * * *